US011186073B2

(12) United States Patent
Hensley et al.

(10) Patent No.: US 11,186,073 B2
(45) Date of Patent: Nov. 30, 2021

(54) FLUID-FILLED BODY AND METHOD FOR FORMING THE SAME

(71) Applicant: NIKE, Inc., Beaverton, OR (US)

(72) Inventors: Taryn M. Hensley, Portland, OR (US); Dervin A. James, Hillsboro, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/712,336

(22) Filed: Dec. 12, 2019

(65) Prior Publication Data

US 2020/0114634 A1 Apr. 16, 2020

Related U.S. Application Data

(62) Division of application No. 15/459,165, filed on Mar. 15, 2016, now abandoned.

(60) Provisional application No. 62/308,796, filed on Mar. 15, 2016.

(51) Int. Cl.
| | |
|---|---|
| *B32B 27/40* | (2006.01) |
| *A43B 1/00* | (2006.01) |
| *A43B 13/04* | (2006.01) |
| *A43B 13/18* | (2006.01) |
| *A43B 13/20* | (2006.01) |
| *B29D 35/08* | (2010.01) |
| *B32B 3/26* | (2006.01) |
| *B32B 19/04* | (2006.01) |

(52) U.S. Cl.
CPC ............. *B32B 27/40* (2013.01); *A43B 1/0027* (2013.01); *A43B 1/0072* (2013.01); *A43B 13/04* (2013.01); *A43B 13/186* (2013.01); *A43B 13/188* (2013.01); *A43B 13/189* (2013.01); *A43B 13/20* (2013.01); *B29D 35/08* (2013.01); *B32B 3/26* (2013.01); *B32B 19/045* (2013.01); *B32B 2437/02* (2013.01)

(58) Field of Classification Search
CPC ......... B32B 27/40; B32B 3/26; B32B 19/045; A43B 1/0072; A43B 1/0027; A43B 13/04; A43B 13/186; A43B 13/189
See application file for complete search history.

(56) References Cited

U.S. PATENT DOCUMENTS

| | | | |
|---|---|---|---|
| 5,042,176 | A | 8/1991 | Rudy |
| 5,713,141 | A | 2/1998 | Mitchell et al. |
| 8,389,113 | B2 | 3/2013 | Ambrose et al. |
| 2005/0097777 | A1 | 5/2005 | Goodwin |
| 2006/0241211 | A1 | 10/2006 | Coughlin et al. |
| 2015/0257481 | A1 | 9/2015 | Campos, II et al. |

(Continued)

OTHER PUBLICATIONS

European Patent Office (ISA), International Search Report and Written Opinion for PCT Application No. PCT/US2017/022481, dated Jun. 21, 2017.

(Continued)

*Primary Examiner* — Hai Vo
(74) *Attorney, Agent, or Firm* — Honigman LLP; Matthew H. Szalach; Jonathan O'Brien

(57) ABSTRACT

A fluid-filled chamber is provided and includes a first barrier layer, a second barrier layer attached to the first barrier layer and cooperating with the first barrier layer to define an interior void, and a third layer attached to one of the first barrier layer and the second barrier layer including mineral mica that provides the one of the first barrier layer and the second barrier layer with an iridescent appearance caused by differential refraction of light waves.

7 Claims, 24 Drawing Sheets

(56) References Cited

U.S. PATENT DOCUMENTS

2015/0257483 A1 9/2015 Meschter et al.
2015/0327627 A1 11/2015 Brandt et al.

OTHER PUBLICATIONS

USPTO, Non-Final Office Action for U.S. Appl. No. 15/459,165, dated Apr. 17, 2019.
EPO Communicaton for Application 17713566.2 dated May 27, 2021.

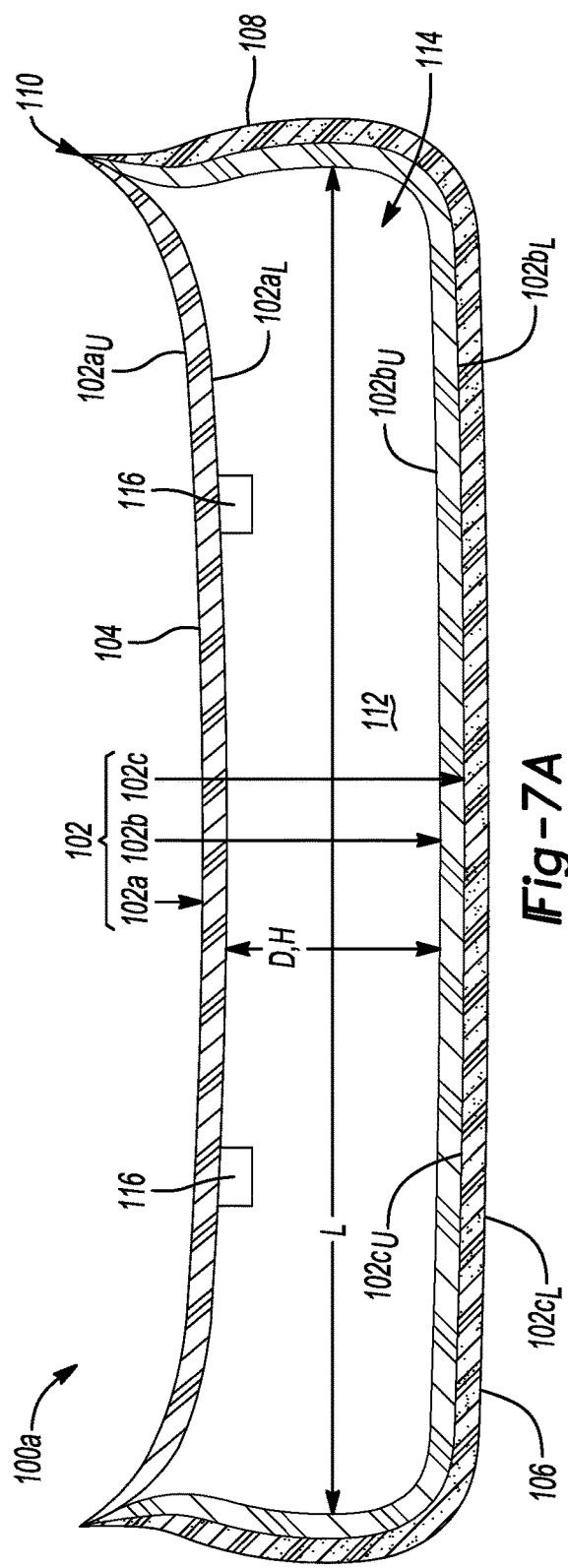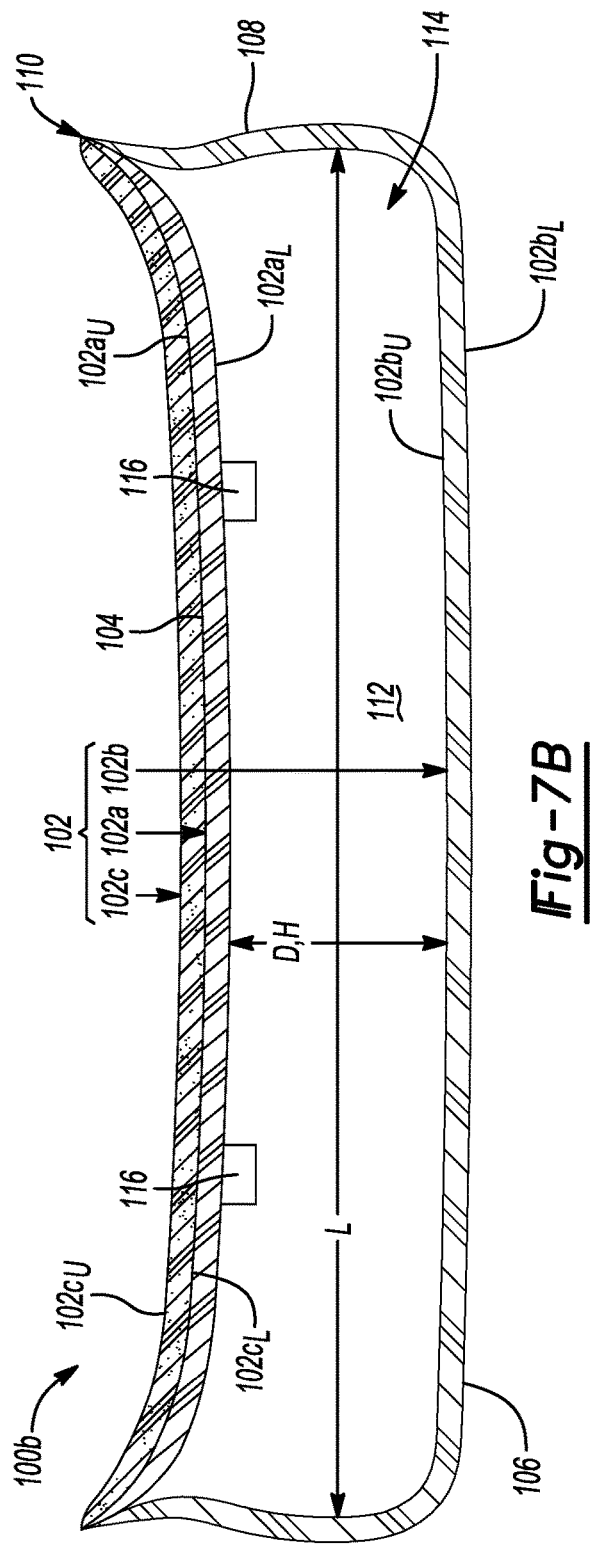

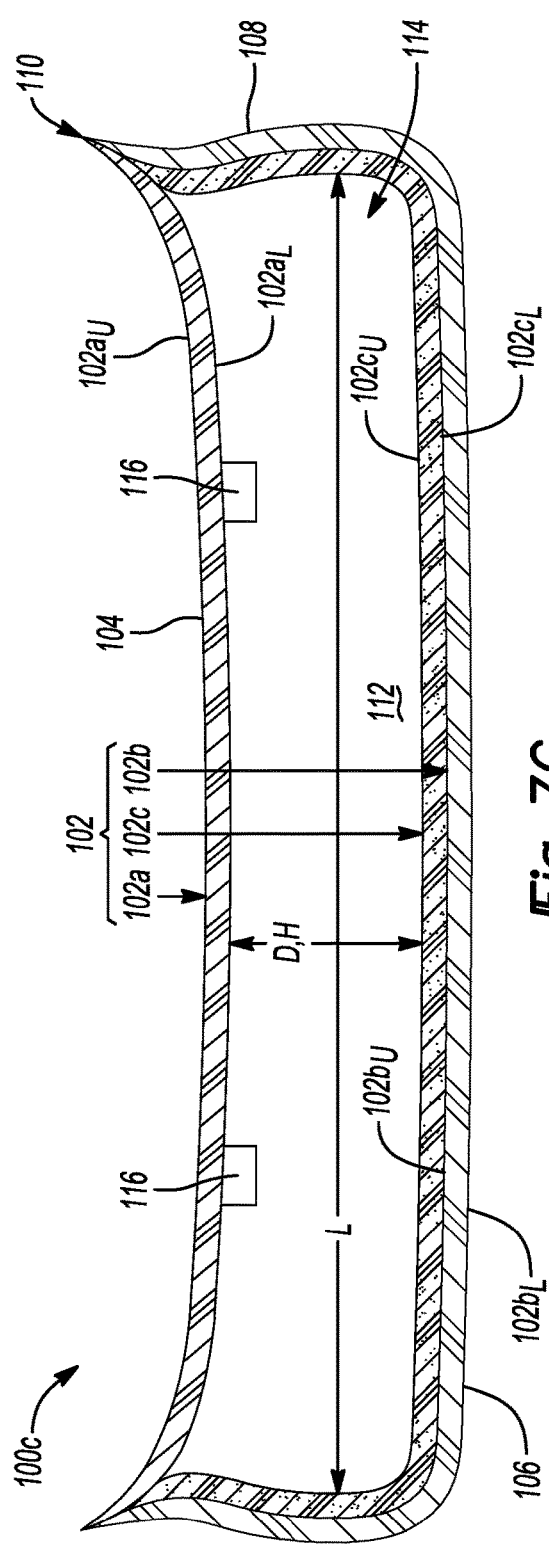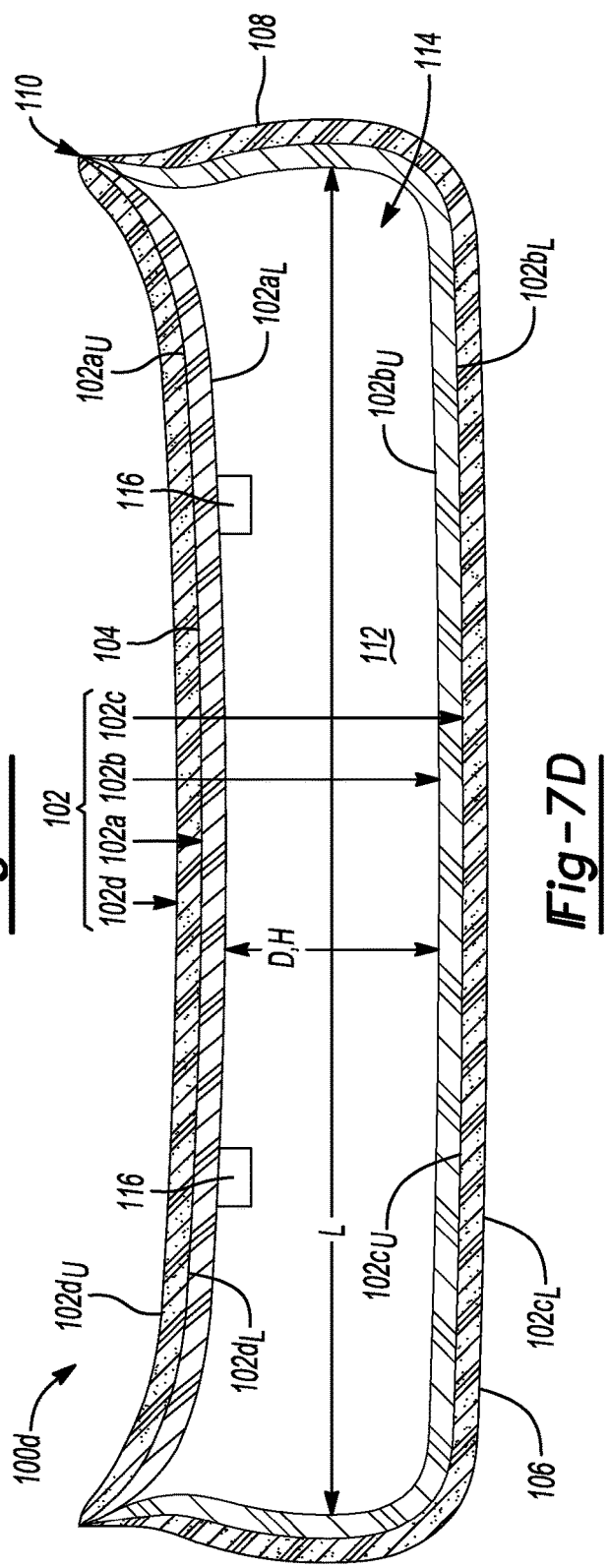

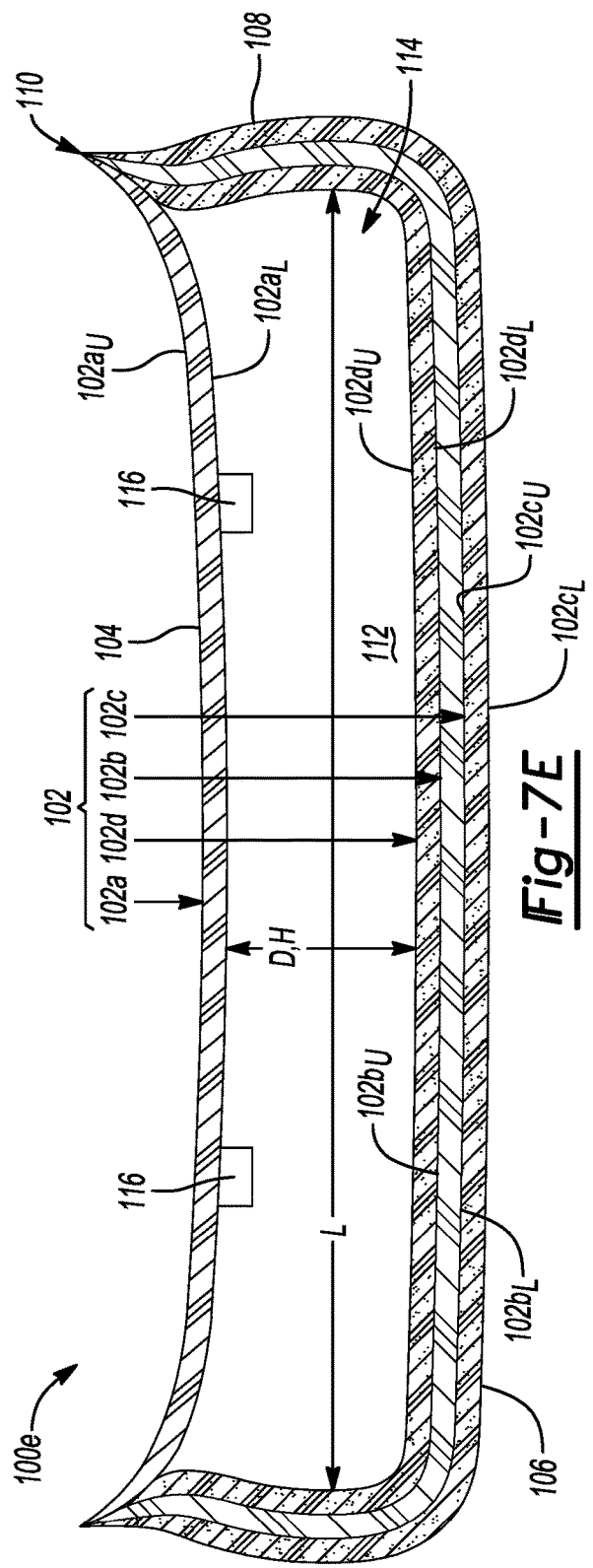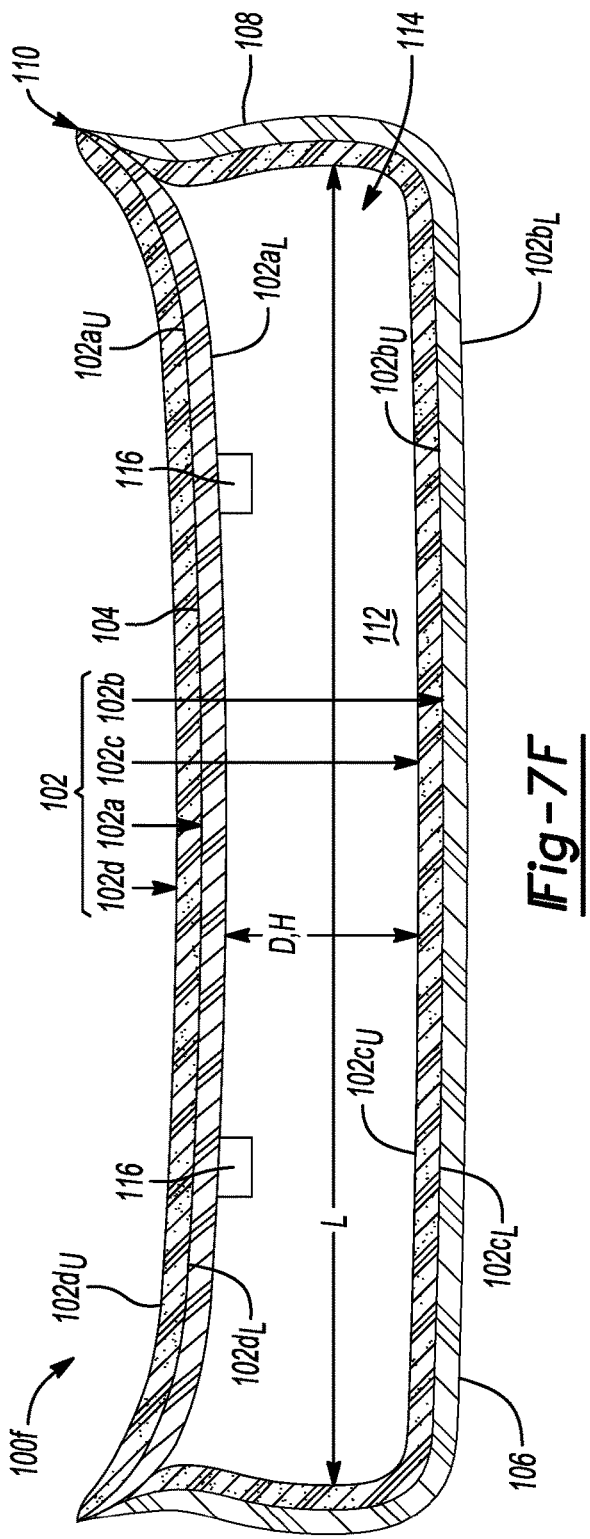

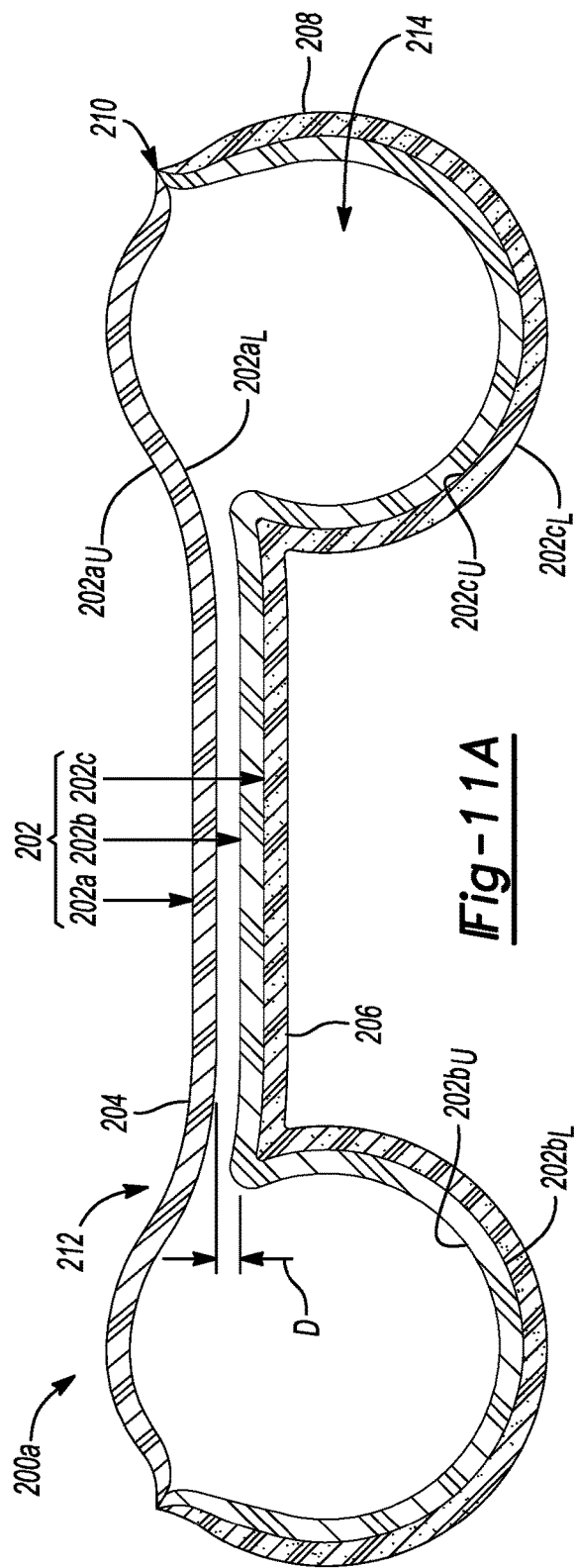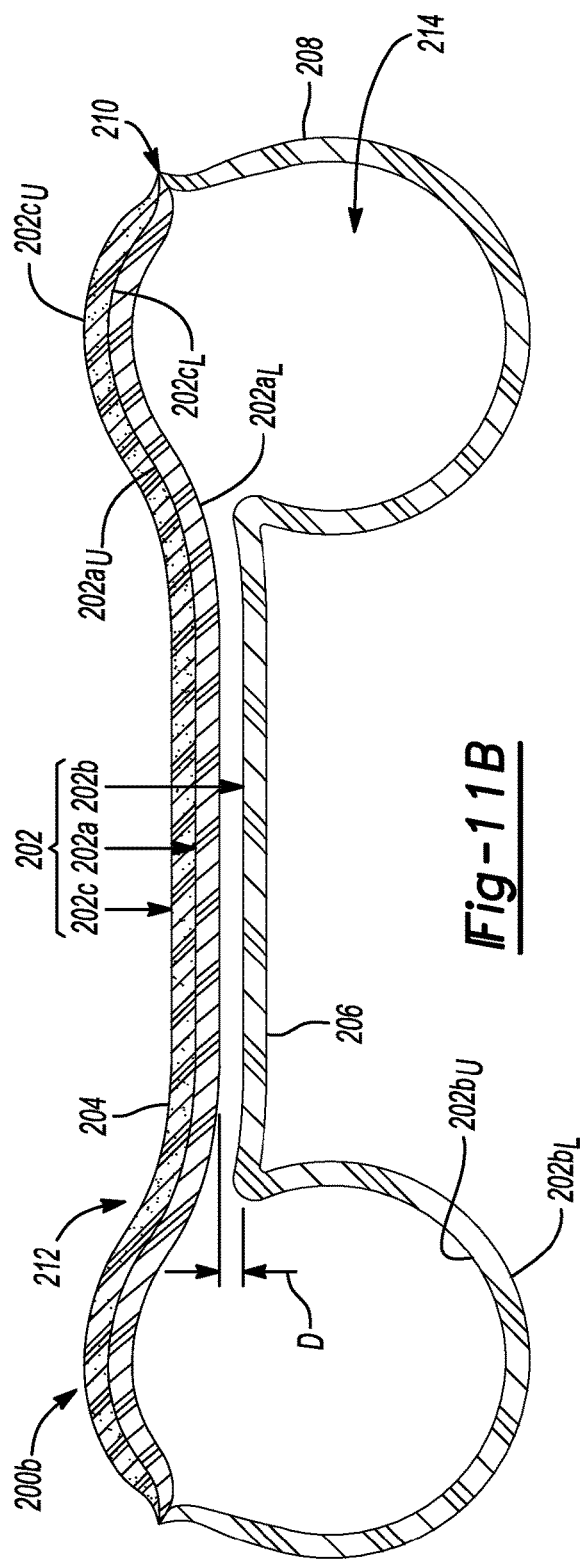

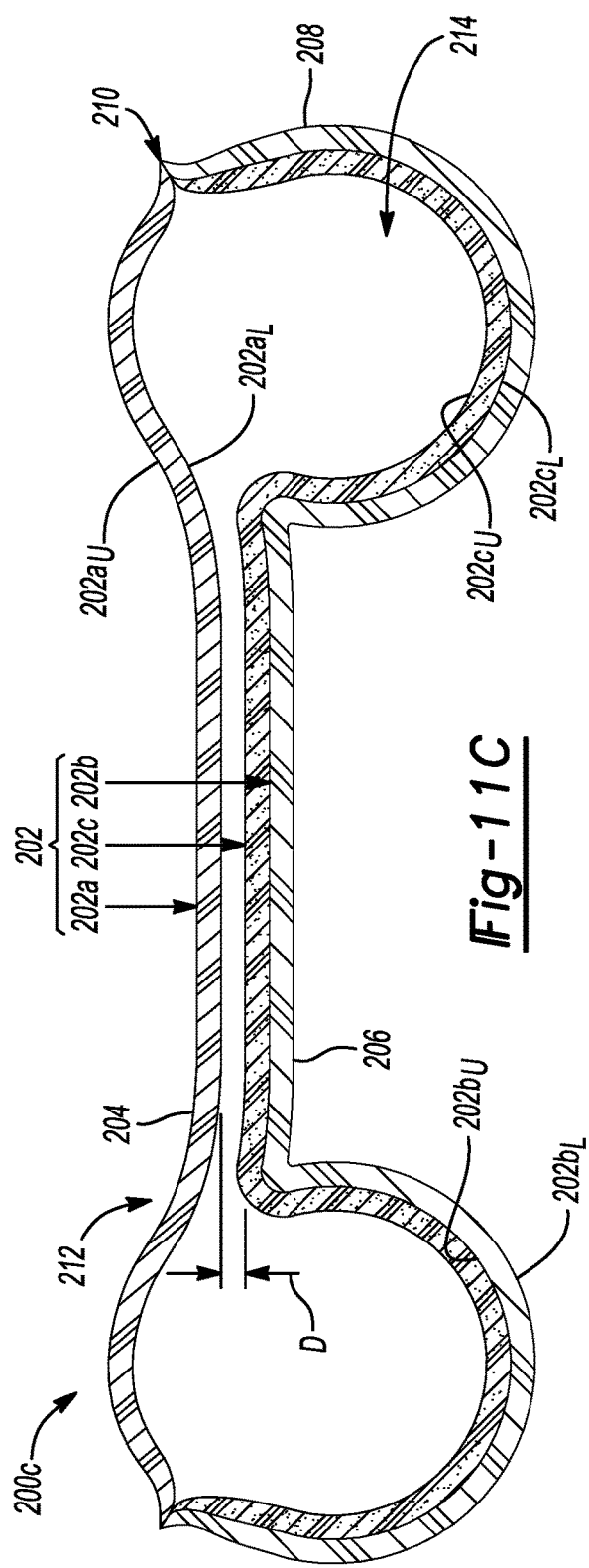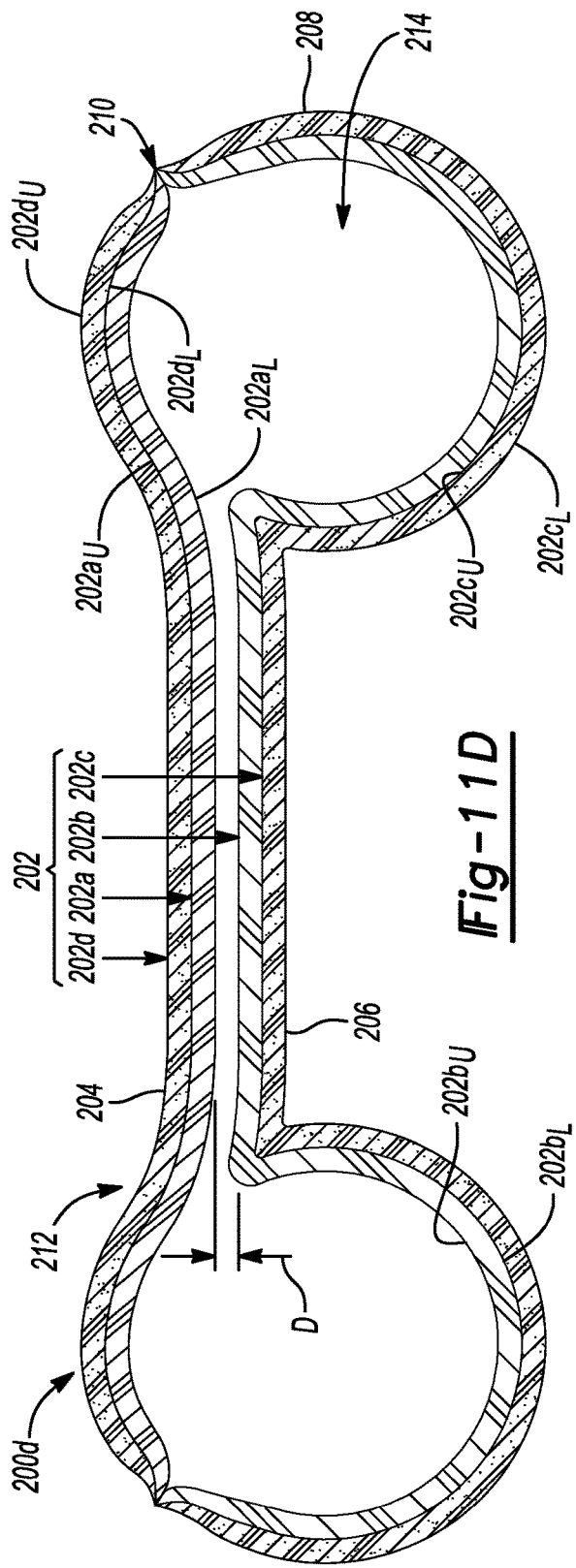

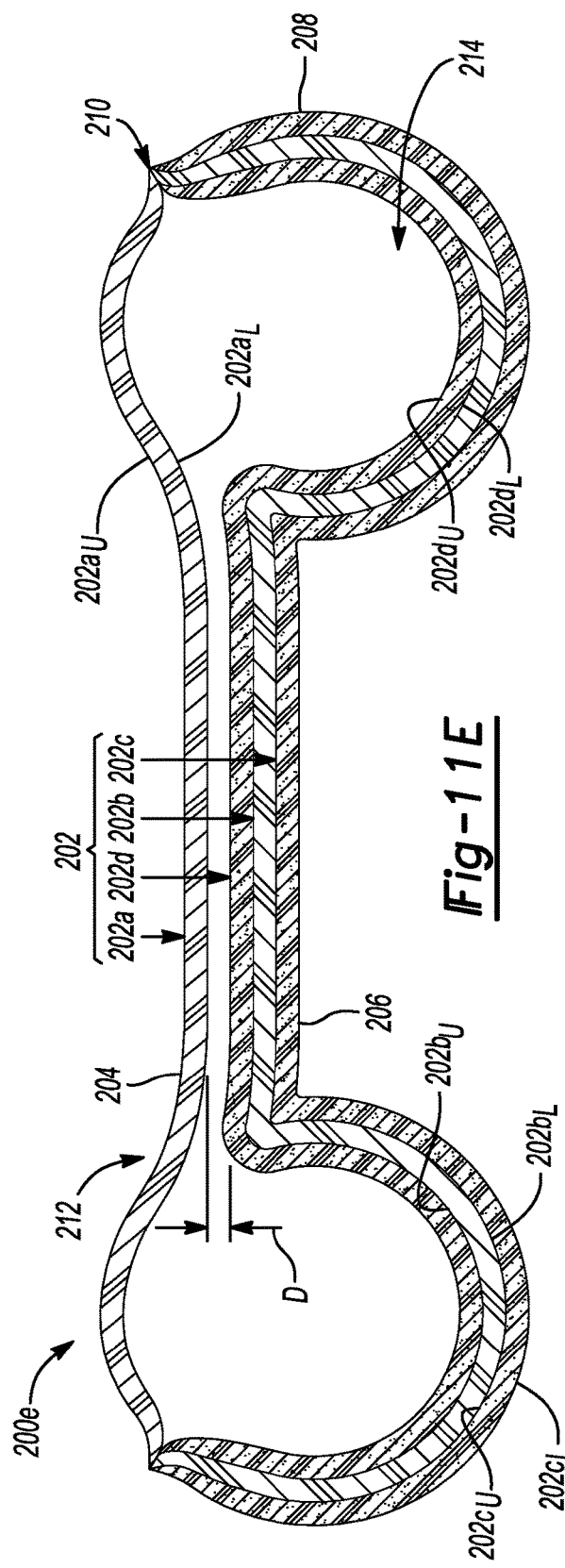
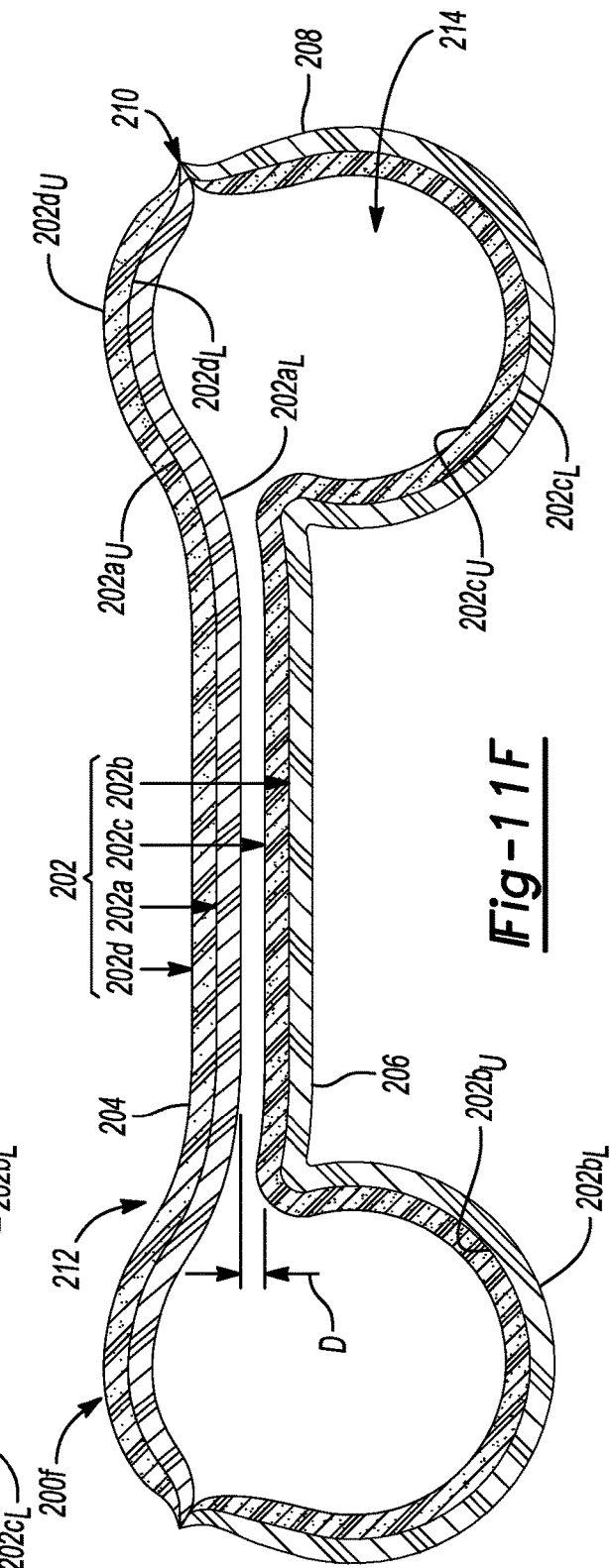
Fig-11E
Fig-11F

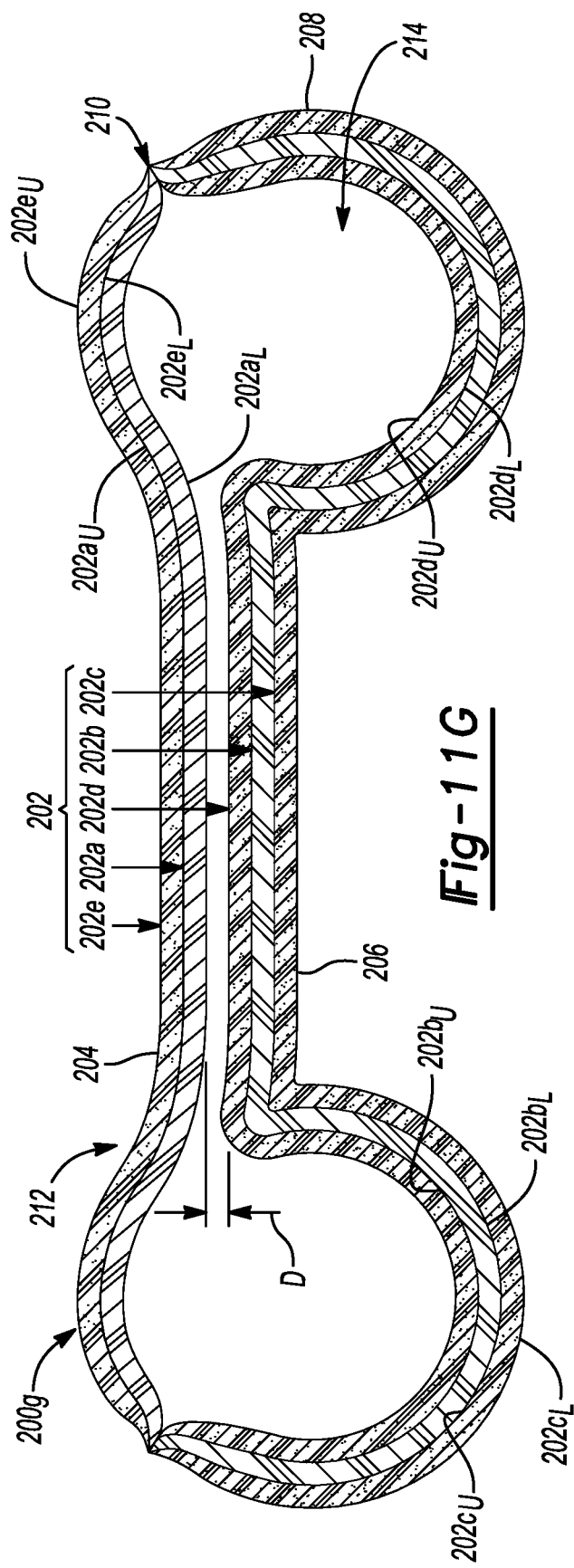

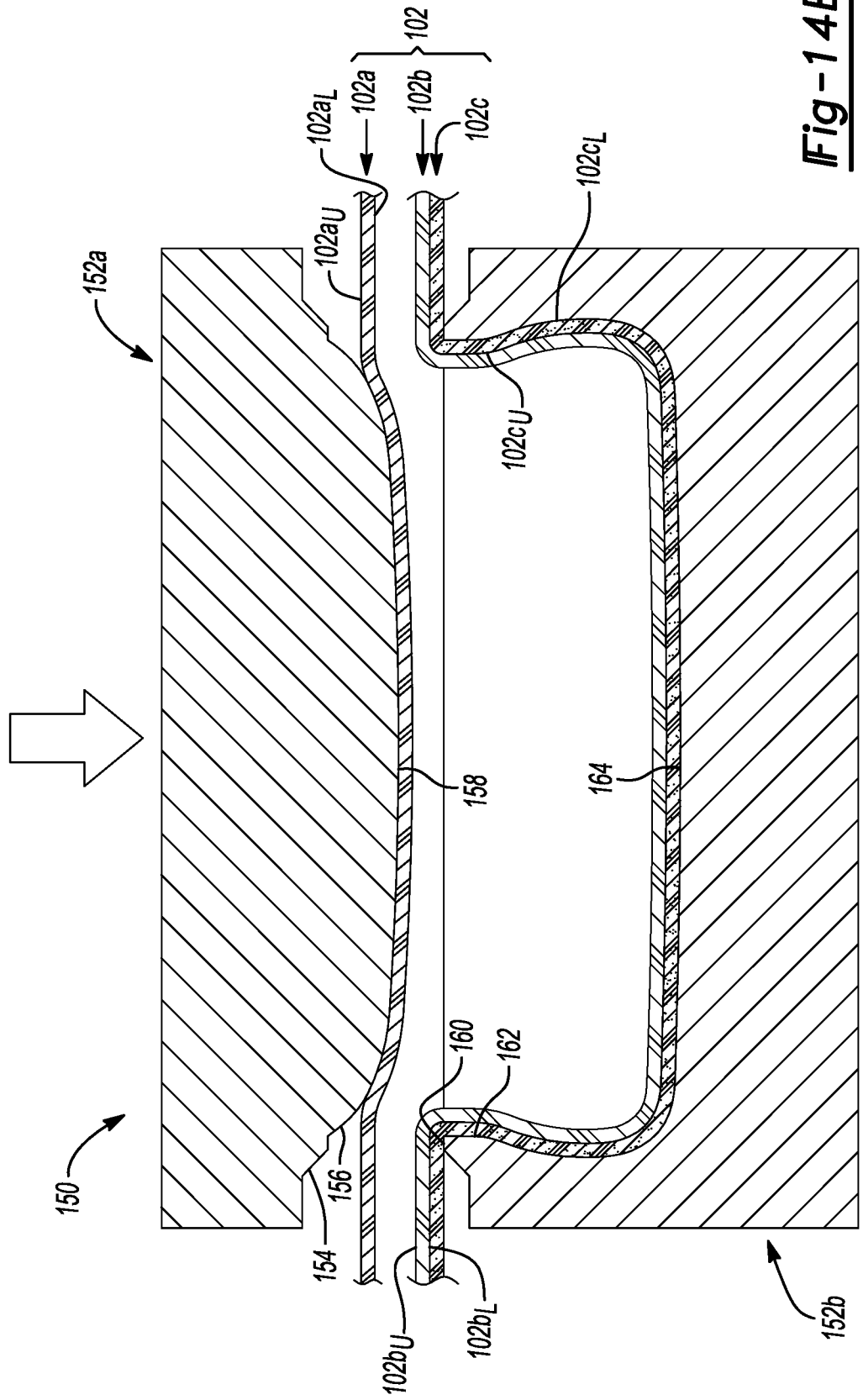

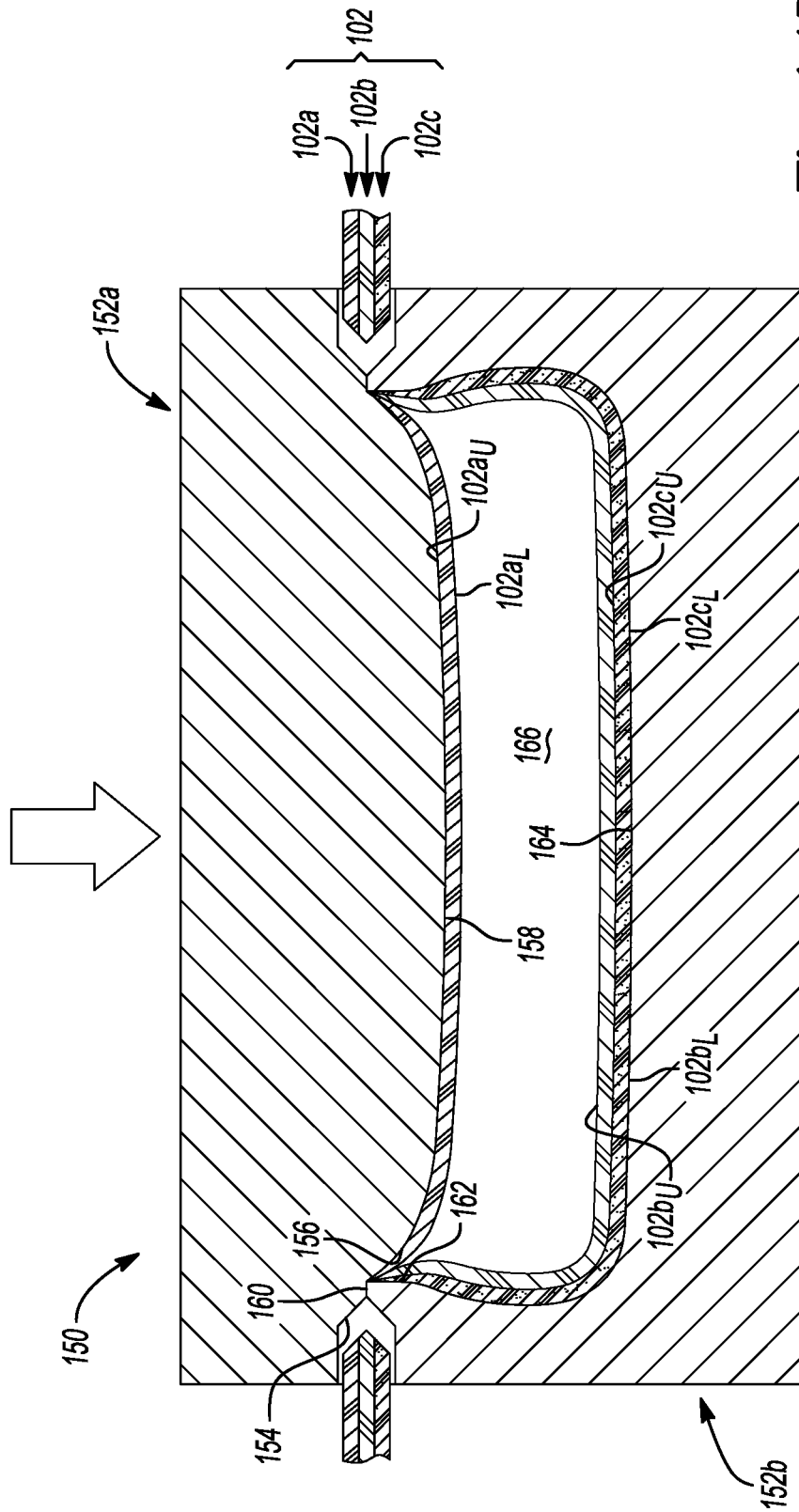

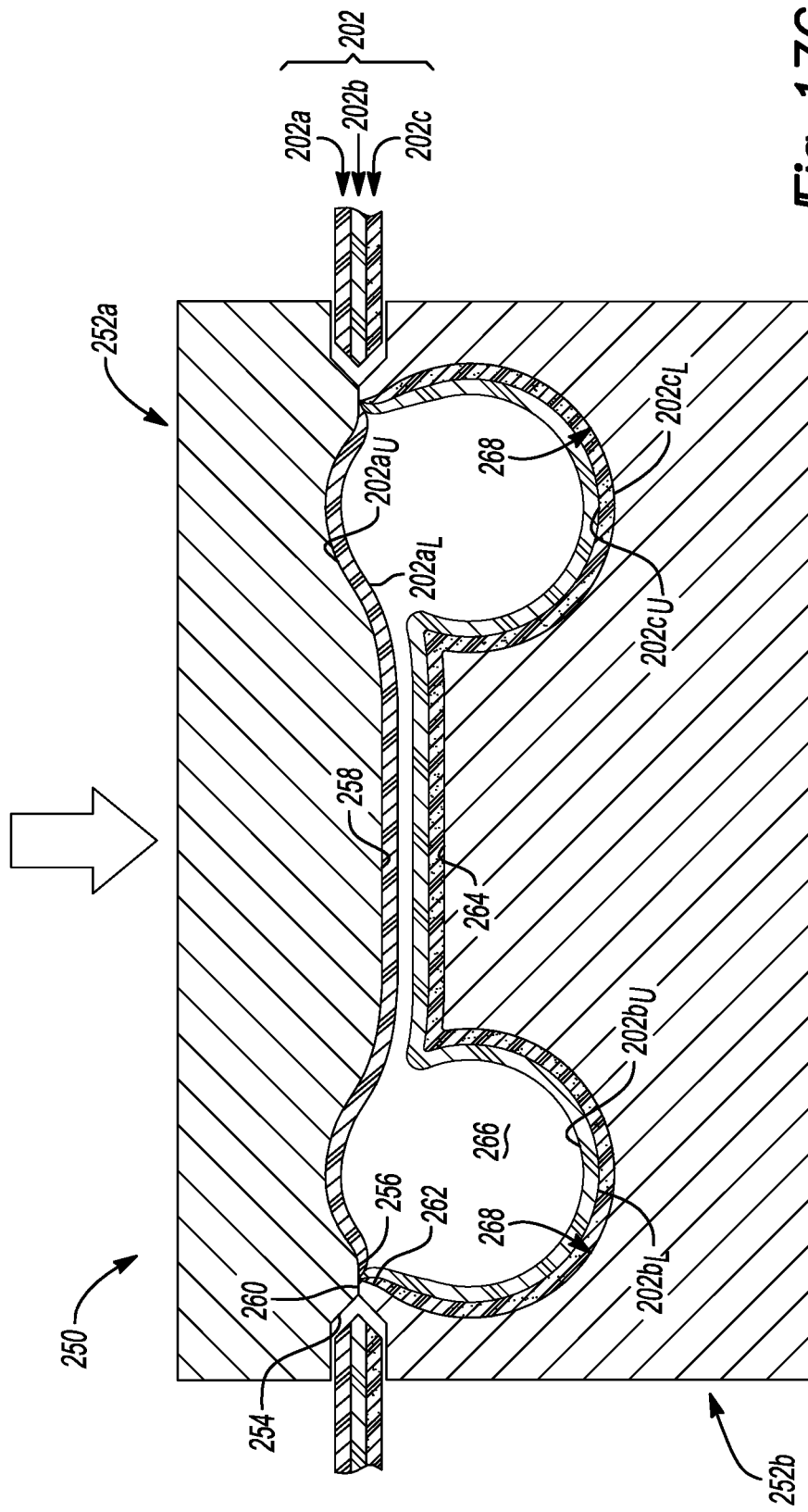

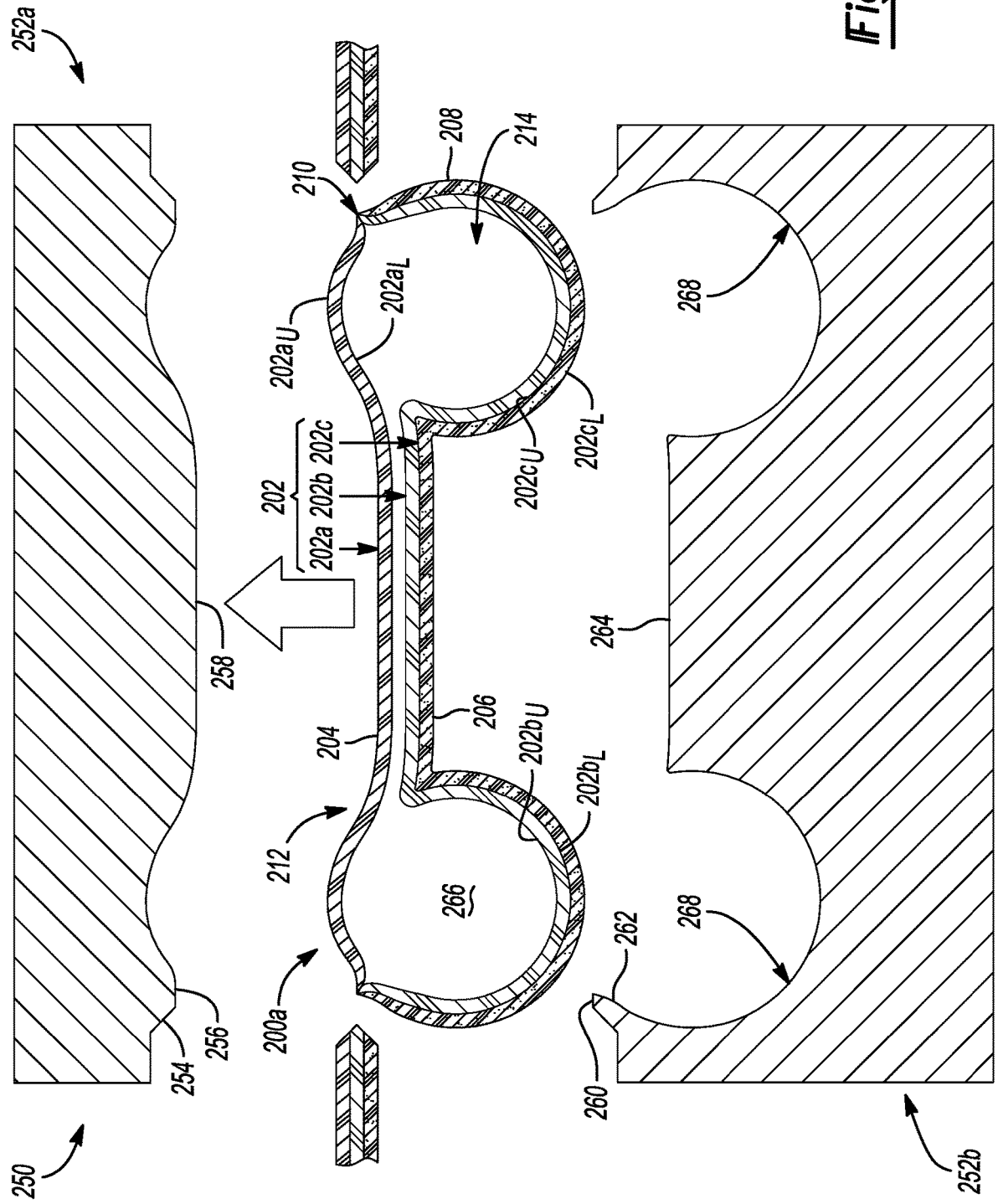

FLUID-FILLED BODY AND METHOD FOR FORMING THE SAME

CROSS REFERENCE TO RELATED APPLICATION

This application is a division of U.S. application Ser. No. 15/459,165, filed Mar. 15, 2017, which claims priority to U.S. Provisional Application Ser. No. 62/308,796, filed Mar. 15, 2016, the disclosures of which are hereby incorporated by reference in their entirety.

FIELD

The present disclosure relates generally to a fluid-filled chamber and a method for forming the same.

BACKGROUND

This section provides background information related to the present disclosure which is not necessarily prior art.

Articles of footwear are typically designed and constructed with a particular purpose in mind. For example, an article of footwear for use in an athletic event is typically designed to provide a particular response to an athlete based on the requirements of the event.

Articles of footwear for use during running, for example, typically include an insole, a midsole, and an outsole that cooperate to simultaneously provide an athlete with comfort, support, and performance during forward movement (i.e., to help propel the wearer forward). Similarly, articles of footwear for use in other activities such as basketball and football are similarly designed with the athlete in mind to provide comfort and support during the particular activity. In basketball and football, however, the article of footwear may be designed and constructed to support a foot of the athlete during cutting and lateral movements rather than primarily in forward movements, as with an article of footwear specifically designed for running. Further, articles of footwear intended for use during a football game likely also include a series of cleats that protrude from an outsole to provide the athlete with traction on a given playing surface.

While articles of footwear are typically designed with performance in mind, more and more, articles of footwear are designed to also provide a unique and distinctive aesthetic appearance along with a desired level of performance.

DRAWINGS

The drawings described herein are for illustrative purposes only of selected configurations and not all possible implementations, and are not intended to limit the scope of the present disclosure.

FIG. 7A is a cross-sectional view of the forefoot portion taken along Line 7A-7A of FIG. 5;

FIGS. 7B-7G illustrate cross-sectional views of alternative forefoot portions;

FIG. 11A is a cross-sectional view of the heel portion taken along Line 11A-11A of FIG. 9;

FIGS. 11B-11G illustrate cross-sectional views of alternative heel portions;

FIGS. 14A-14E illustrate cross-sectional views taken along Line 14-14 of FIG. 12 or FIG. 13 depicting a manufacturing process for forming the forefoot portion of FIGS. 4-7A utilizing the mold of FIG. 12;

FIGS. 17A-17D illustrate cross-sectional views taken along Line 17-17 of FIG. 15 or FIG. 16 depicting a manufacturing process for forming the heel portion of FIGS. 8-11A utilizing the mold of FIG. 15.

Corresponding reference numerals indicate corresponding parts throughout the drawings.

DETAILED DESCRIPTION

Figure 1:
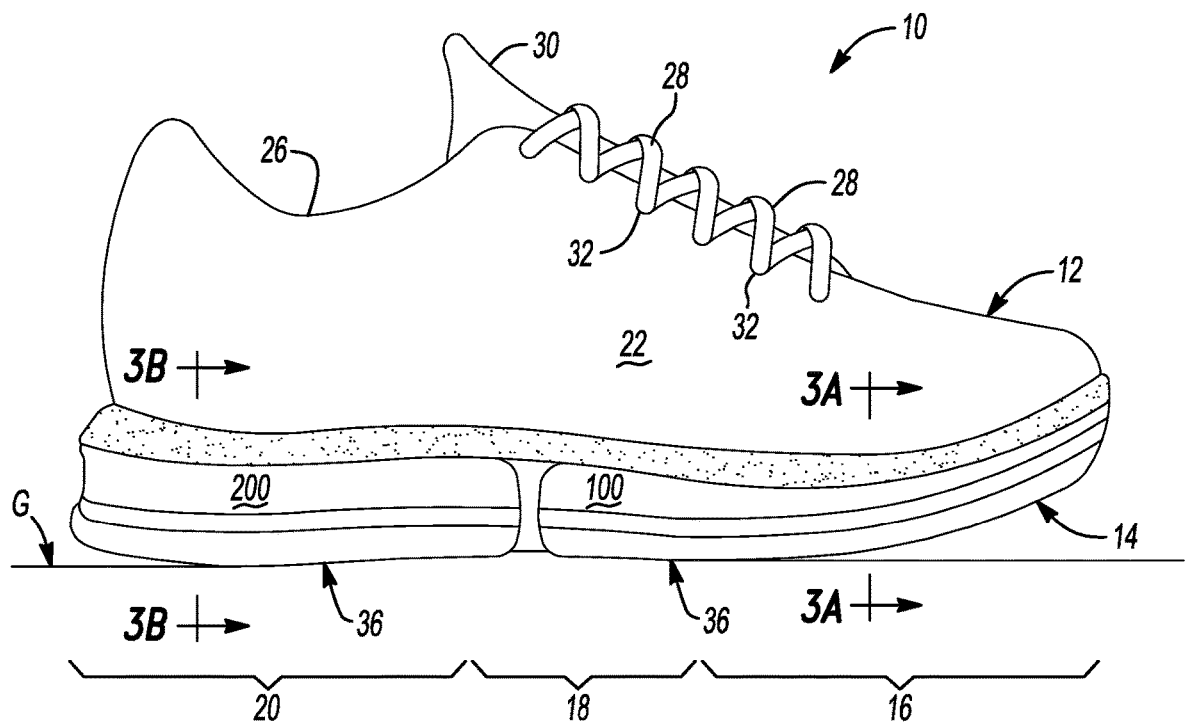
FIG. 1 is a lateral side view of an exemplary article of footwear in accordance with the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

A fluid-filled chamber is provided and includes a first barrier layer, a second barrier layer attached to the first barrier layer and cooperating with the first barrier layer to define an interior void, and a third layer attached to one of the first barrier layer and the second barrier layer and including mineral mica that provides the one of the first barrier layer and the second barrier layer with an iridescent appearance caused by differential refraction of light waves.

In one configuration, the third layer may be formed from a polymer material such as a polyurethane material.

The mica may be deposited on an outer surface of the third layer and/or is impregnated in the third layer and may be at least one of ground mica, built-up mica, and sheet mica.

The third layer may be disposed within the interior void. Alternatively, the third layer may be attached to an exterior surface of at least one of the first barrier layer and the second barrier layer.

In one configuration, the third layer may be attached to an interior surface of at least one of the first barrier layer and the second barrier layer within the interior void.

An article of footwear may be provided and may incorporate the fluid-filled chamber described.

A method is provided and includes attaching a first iridescent material to a first barrier sheet, inserting the first barrier sheet into a mold, inserting a second barrier sheet into the mold, and applying at least one of heat and pressure to at least one of the first barrier sheet, the second barrier sheet, and the iridescent material via the mold. The method also includes joining the first barrier sheet and the second barrier sheet together to define a chamber and inflating the chamber.

Inserting the first barrier sheet into the mold may include positioning the first iridescent material between the first barrier sheet and the second barrier sheet.

Inserting the first barrier sheet into the mold may include positioning the first barrier sheet between the first iridescent material and the second barrier sheet.

A second iridescent material may be attached to the second barrier sheet. Inserting the second barrier sheet into the mold may include positioning the second iridescent material between the second barrier sheet and the first barrier sheet. Inserting the second barrier sheet into the mold may include positioning the second barrier sheet between the second iridescent material and the first barrier sheet.

Providing the first iridescent material may include providing a polymer material having an iridescent appearance caused by differential refraction of light waves.

Providing the first iridescent material may include providing a material including mica and/or providing a material impregnated with mica.

The method may also include incorporating the chamber into an article of footwear.

In another configuration, a method is provided and includes inserting a first barrier sheet into a mold, inserting a second barrier sheet into a mold, inserting a first iridescent sheet into the mold, and applying at least one of heat and pressure to the first barrier sheet, the second barrier sheet, and the iridescent sheet via the mold. The method also includes joining the first barrier sheet and the second barrier sheet together to define a chamber, joining the iridescent sheet to at least one of the first barrier sheet and the second barrier sheet, and inflating the chamber.

Inserting the first barrier sheet into the mold may include positioning the first iridescent material between the first barrier sheet and the second barrier sheet.

Inserting the first barrier sheet into the mold may include positioning the first barrier sheet between the first iridescent material and the second barrier sheet.

The method may additionally include inserting a second iridescent material into the mold. Inserting the second iridescent material into the mold may include positioning the second iridescent material between the second barrier sheet and the first barrier sheet. Inserting the second iridescent material into the mold may include positioning the second barrier sheet between the second iridescent material and the first barrier sheet.

Providing the first iridescent material may include providing a polymer material having an iridescent appearance caused by differential refraction of light waves.

Providing the first iridescent material may include providing a material including mica and/or providing a material impregnated with mica.

The method may also include incorporating the chamber into an article of footwear.

Figure 2:
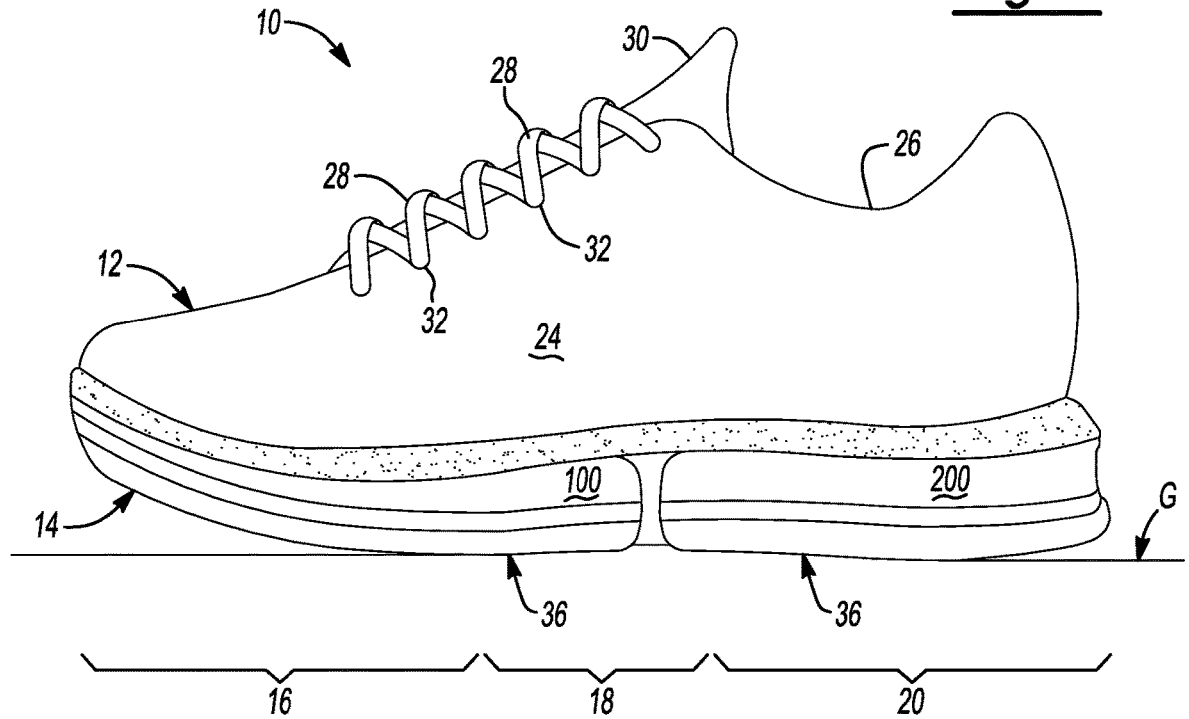
FIG. 2 is a medial side view of the article of footwear of FIG. 1.

Referring to FIGS. 1-2, an article of footwear 10 is shown and includes an upper portion 12 and a sole portion 14. The upper portion 12 provides a comfortable and secure covering for a foot (not shown) of a wearer. As such, the foot may be located within upper portion 12 to effectively secure the foot within the article of footwear 10 or otherwise unite the foot and the article of footwear 10. The sole portion 14 is secured to a lower area of the upper portion 12 and extends between the foot and a ground surface G to, for example: (1) attenuate ground reaction forces (i.e., for cushioning the foot); (2) provide traction; (3) enhance stability; and (4) influence the motions of the foot. The sole portion 14 is located under the foot for providing support to the foot.

The article of footwear 10 may be defined by three regions, such as, for example: (1) a forefoot region 16, (2) a midfoot region 18 and (3) a heel region 20. The forefoot region 16 generally includes portions of the article of footwear 10 corresponding with toes of the foot and the joints connecting the metatarsals with the phalanges. The midfoot region 18 generally includes portions of the article of footwear 10 corresponding with an arch area of the foot.

The heel region 20 generally corresponds with rear portions of the foot, including the calcaneus bone.

The article of footwear 10 also includes a lateral side 22 (see, e.g., FIG. 1) and a medial side 24 (see, e.g., FIG. 2). The lateral side 22 and the medial side 24 define opposite sides of the article of footwear 10 and extend through each of forefoot region 16, the midfoot region 18 and the heel region 20. More particularly, the lateral side 22 corresponds with an outside area of the foot (i.e. the surface that faces away from the other foot), and the medial side 24 corresponds with an inside area of the foot (i.e., the surface that faces toward the other foot).

The forefoot region 16, the midfoot region 18 and the heel region 20 and the lateral side 22 and the medial side 24 are not intended to demarcate precise areas of the article of footwear 10. Rather, the forefoot region 16, the midfoot region 18 and the heel region 20 and the lateral side 22 and the medial side 24 are intended to represent general areas of the article of footwear 10. In addition to the article of footwear 10, the forefoot region 16, the midfoot region 18 and the heel region 20 and the lateral side 22 and the medial side 24 may also be applied to upper portion 12, sole portion 14 and individual elements thereof.

A majority of upper portion 12 may incorporate various material elements that are stitched or adhesively bonded together to form an interior void for securely and comfortably receiving a foot. The material elements may be selected and located in upper portion 12 to selectively impart properties of, for example: (1) durability; air-permeability; wear-resistance; flexibility; and comfort. The void in the upper portion 12 is shaped to accommodate the foot. When the foot is located within the void, therefore, the upper portion 12 extends along a lateral side of the foot, along a medial side of the foot, over the foot, around the heel, and under the foot.

An ankle opening 26 in heel region 20 provides the foot with access to the void. A lace 28 extends over a tongue 30 and through various lace apertures 32 or other lace-receiving elements in upper portion 12. The lace 28 and the adjustability provided by tongue 30 may be utilized for modifying the dimensions of ankle opening 26 and the interior void, thereby securing the foot within the interior void and facilitating entry and removal of the foot from the interior void.

Figure 3A:
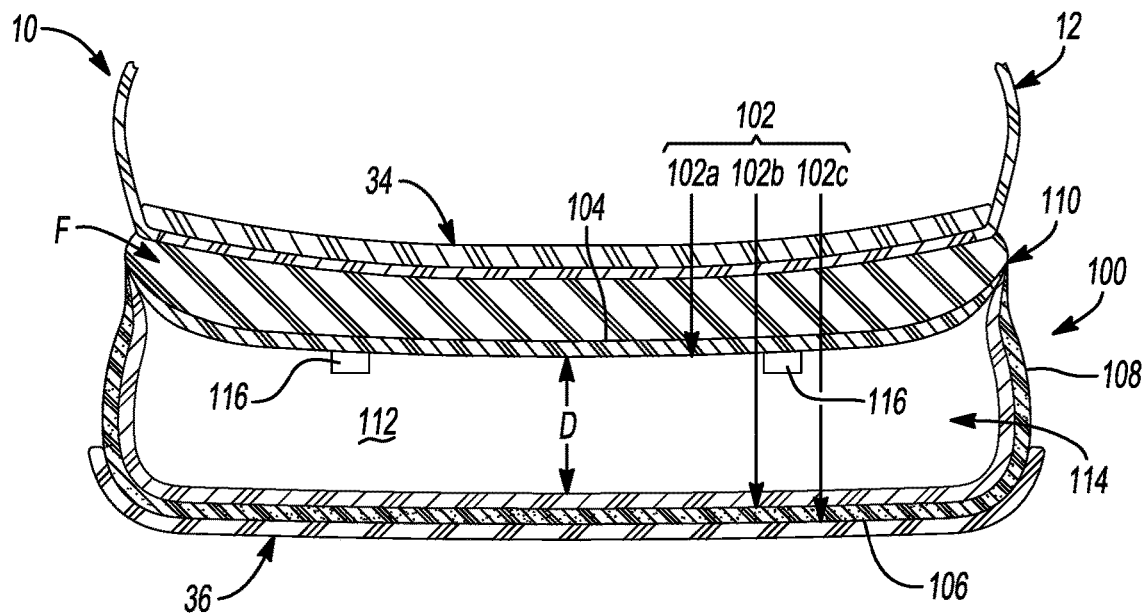
FIG. 3A is an exemplary cross-sectional view of a forefoot portion of the article of footwear taken along Line 3A-3A of FIG. 1.
Figure 3B:
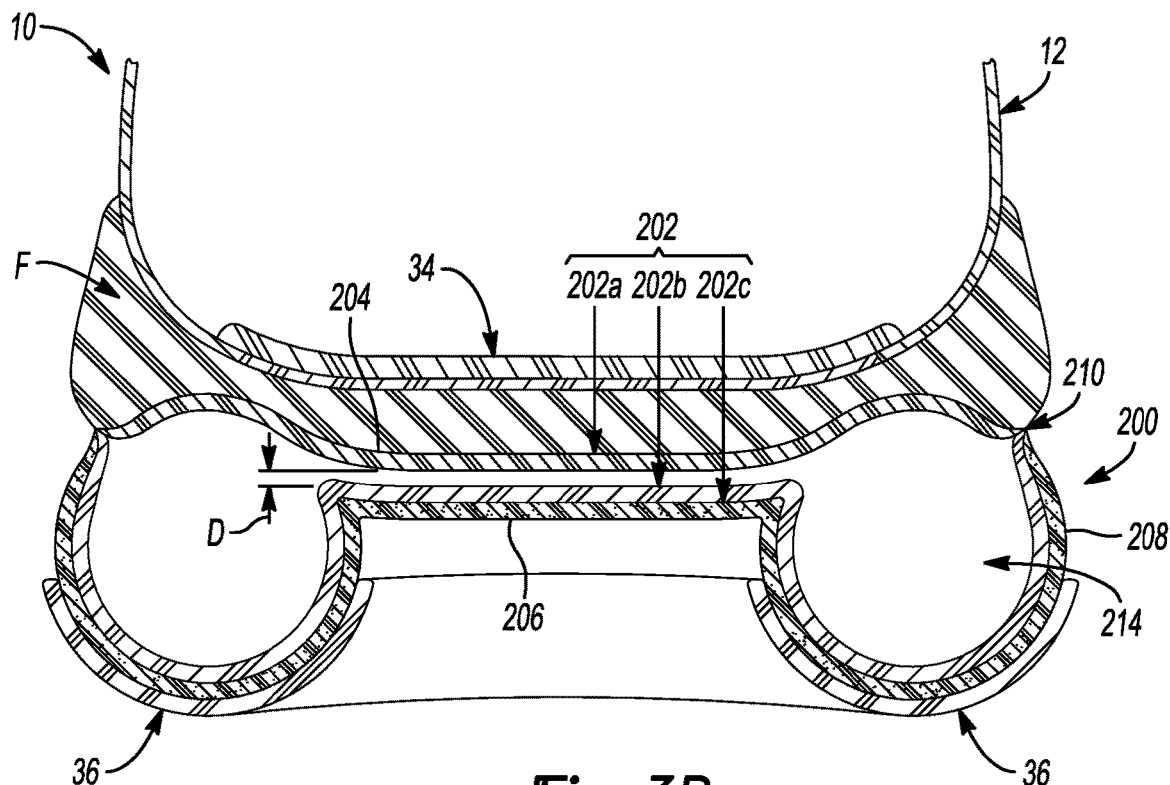
FIG. 3B is an exemplary cross-sectional view of a heel portion of the article of footwear taken along Line 3B-3B of FIG. 1.

Referring to FIGS. 3A and 3B, the upper portion 12 may optionally include an insole or sockliner 34 that is located within the void and positioned to extend under a lower surface of the foot to enhance the comfort of the article of footwear 10.

Referring to FIGS. 1-2, the sole portion 14 includes a forefoot portion 100 and a heel portion 200. Optionally, an outsole portion 36 (see, also, e.g., FIGS. 3A, 3B) may be disposed over at least a portion of one or both of the forefoot portion 100 and the heel portion 200. The outsole portion 36 may be secured to lower areas of one or both of the forefoot portion 100 and the heel portion 200 and may be formed from, for example, a wear-resistant rubber material that is textured to impart traction.

Each of the forefoot portion 100 and the heel portion 200 may be directly secured to a lower area of upper portion 12 and may be formed from a polymer material that encloses a fluid, such as, for example: a gas, liquid, gel or the like. In an example, during walking or running, one or both of the forefoot portion 100 and the heel portion 200 compress between the foot and the ground G, thereby attenuating ground-reaction forces (i.e., one or both of the forefoot portion 100 and the heel portion 200 are inflated and are generally pressurized by the fluid disposed therein for cushioning the foot).

In some configurations, the sole portion 14 may include a foam layer F (see, e.g., FIGS. 3A, 3B) that, for example, extends between the upper portion 12 and one or both of the forefoot portion 100 and the heel portion 200. Alternatively, a foam element (not shown) may be located within indentations that may be formed in the lower areas of one or both of the forefoot portion 100 and the heel portion 200.

Figure 4:
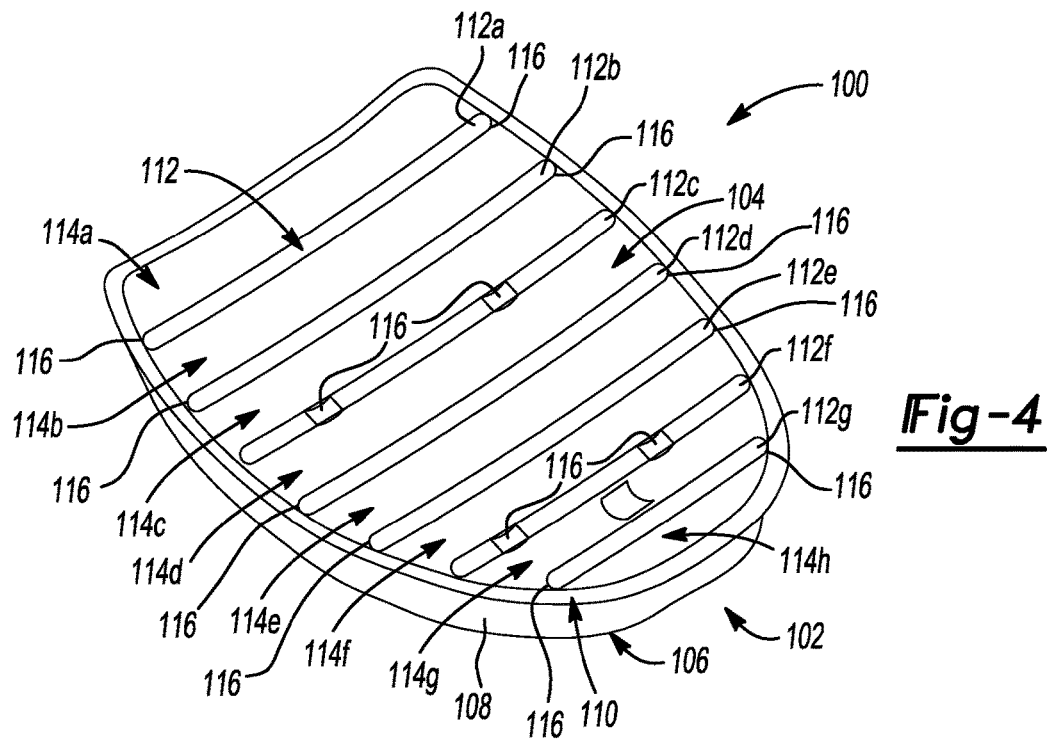
FIG. 4 is a perspective view of an exemplary forefoot portion of the article of footwear of FIGS. 1-2.
Figure 5:
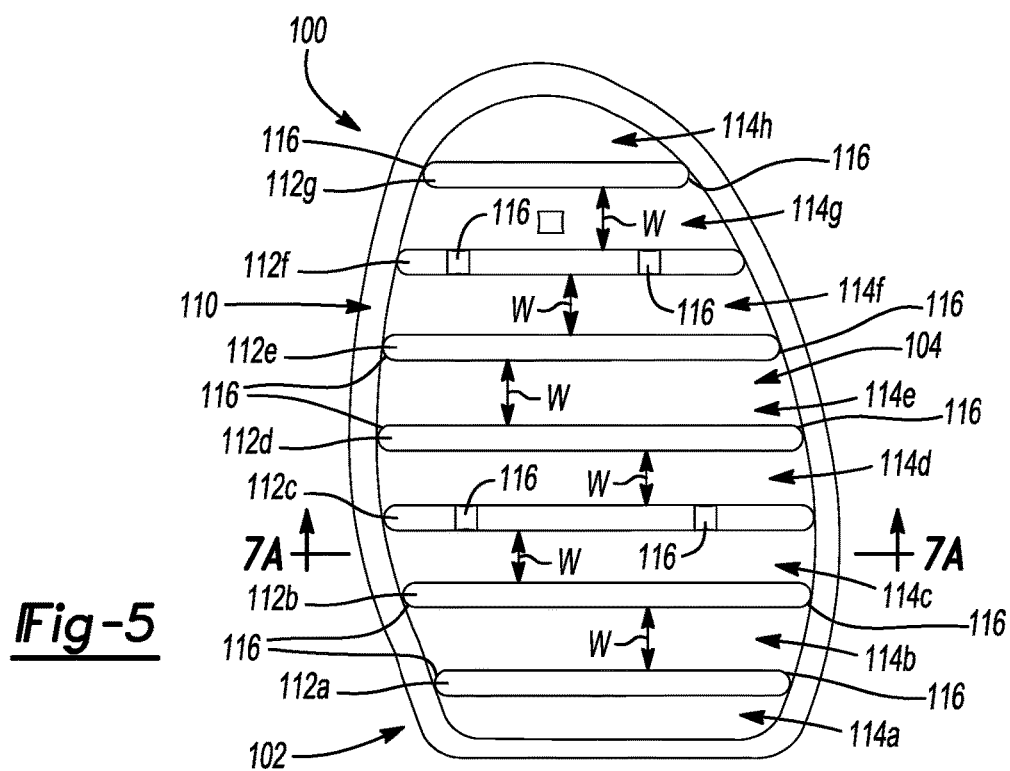
FIG. 5 is a top plan view of the forefoot portion of FIG. 4.
Figure 6:
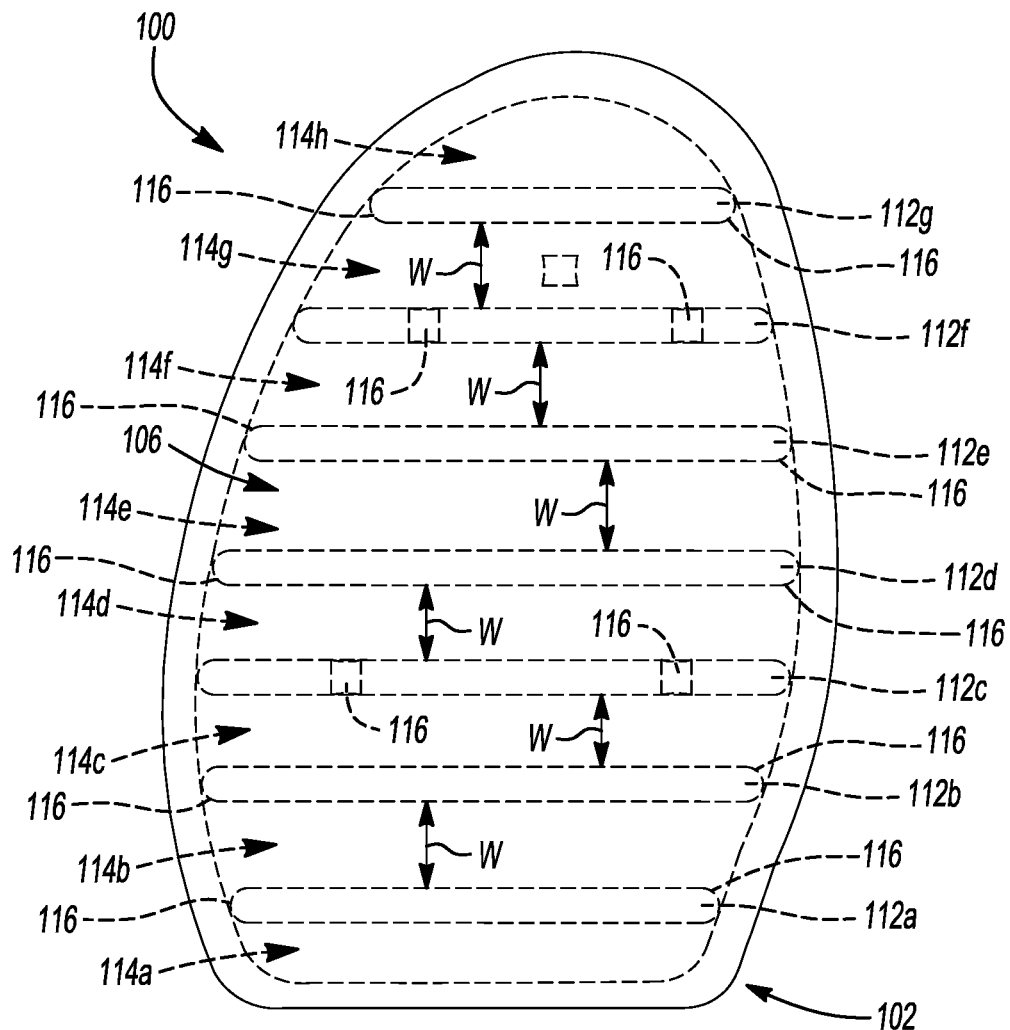
FIG. 6 is a bottom plan view of the forefoot portion of FIG. 4.

Referring to FIGS. 4-6, the exemplary forefoot portion 100 is shown isolated from the article of footwear 10. A cross-sectional view of an exemplary forefoot portion (referenced from the forefoot portion 100 of FIGS. 4-6) is shown generally at 100a in FIG. 7A. The exemplary forefoot portion 100a is also represented as a portion of the article of footwear 10 in FIG. 3A, and, furthermore, a method for manufacturing the exemplary forefoot portion 100a is also described in the following disclosure and shown in FIGS. 14A-14E. Although a structural configuration of the forefoot portion 100 as represented by the cross-sectional views of FIGS. 3A, 7A and 14A-14E is shown, the exemplary forefoot portion 100a should not be interpreted as a limiting structural configuration of the forefoot portion 100, alone, or, an article of footwear 10 incorporating the forefoot portion 100. Accordingly, the forefoot portion 100, or, an article of footwear 10 including the forefoot portion 100 may include alternative structural configurations as seen and described in, but not limited to, exemplary forefoot portions shown generally at 100b, 100c, 100d, 100e, 100f and 100g in FIGS. 7B, 7C, 7D, 7E, 7F and 7G, respectively.

Referring to FIGS. 4-6, the forefoot portion 100 may define an exemplary fluid-filled body 102 derived from three or more layers of material. In an example, the three or more layers of material may include two or more barrier layers and one or more iridescent layers.

Figure 14A:
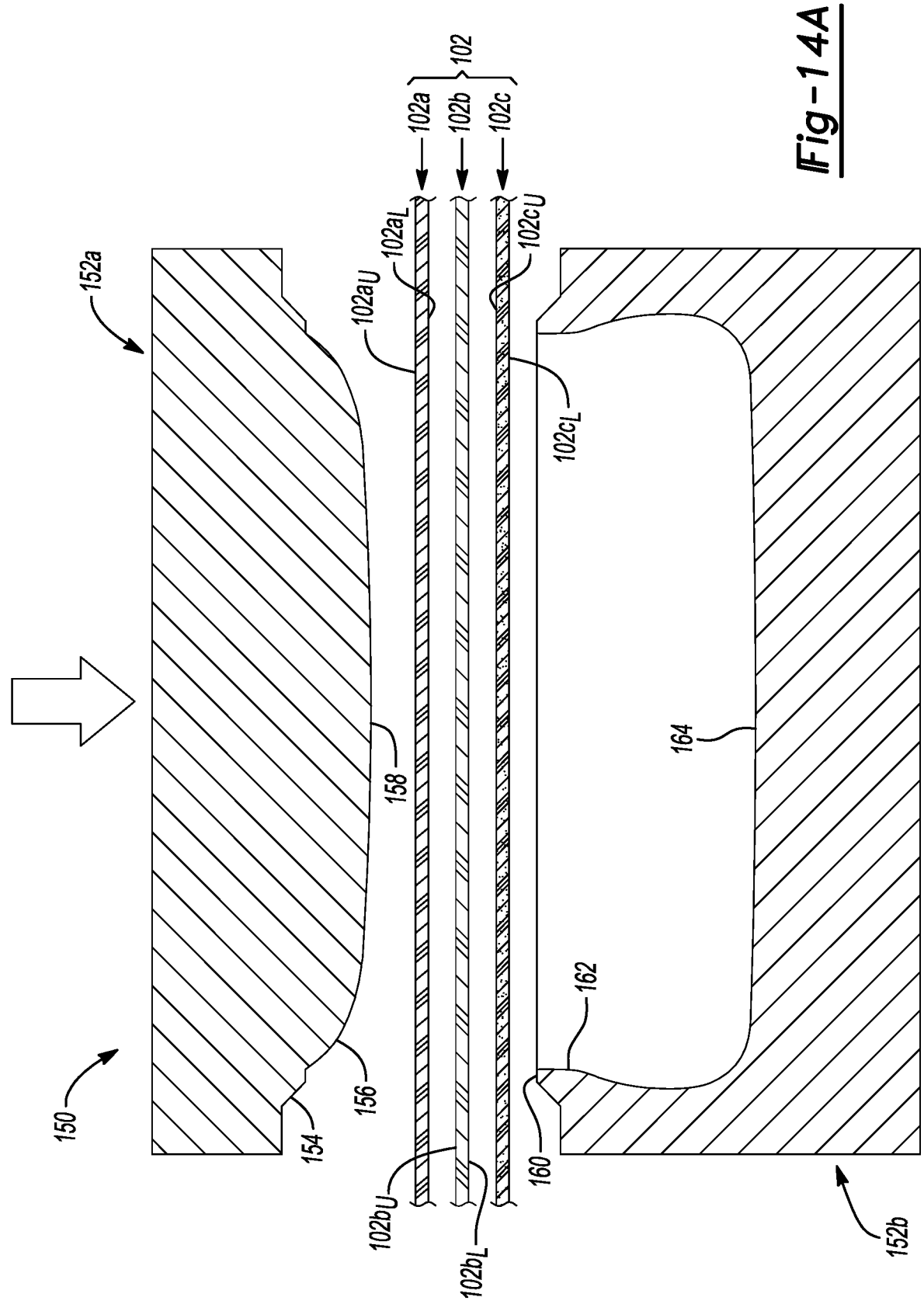

In one example as seen in FIGS. 7A and 14A, the exemplary forefoot portion 100a is defined by a fluid-filled body 102 derived from a first layer of material defining a first barrier layer 102a, a second layer of material defining a second barrier layer 102b, and a third layer of material defining an iridescent layer 102c. With reference to FIG. 7A, the fluid-filled body 102 defining the forefoot portion 100a is formed by arranging: (1) at least a portion of an upper surface $102c_U$ of the iridescent layer 102c adjacent a lower surface $102b_L$ of the second barrier layer 102b and (2) at least a portion of an upper surface $102b_U$ of the second barrier layer 102b adjacent a lower surface $102a_L$ of the first barrier layer 102a.

At least one of the first barrier layer 102a and the second barrier layer 102b may be formed from a polymer material (e.g., a thermoplastic polyurethane (TPU) material). The one or more iridescent layers 102c may be formed from a polymer material (e.g., a polyurethane (PU) material) that provides at least a portion of the fluid-filled body 102 defining the forefoot portion 100a with an iridescent appearance caused by a diffraction of light waves directed toward the fluid-filled body 102.

In some instances, the one or more iridescent layers 102c includes mica. In some examples, the mica is deposited on one or both of an upper surface $102c_U$ and a lower surface $102c_L$ of the one or more iridescent layers 102c. In other examples, the one or more iridescent layers 102c is impregnated with mica.

In some instances, the PU material defining the one or more iridescent layers 102c may be commercially available from Korea Fine Chemical Co., Ltd. and sold under the trade-name Excellon RL. In some examples, the PU material defining the one or more iridescent layers 102c may be defined by one or more of the following characteristics: (1)

a thickness approximately equal to 0.15 mm, (2) a shore A hardness of approximately 95, (3) a tensile strength of approximately 275 kgf/cm$^2$, (4) an elongation of approximately 364%, (5) a 300% modulus of approximately 128 kgf/cm$^2$ and (6) a tear strength of approximately 84 kgf/cm. In some embodiments, the PU material defining the one or more iridescent layers 102c may be defined to have about the same stretchability as the TPU material defining at least one of the first barrier layer 102a and the second barrier layer 102b thereby permitting the PU material defining the one or more iridescent layers 102c to be laminated to the TPU material defining at least one of the first barrier layer 102a and the second barrier layer 102b during a manufacturing procedure (e.g., a molding procedure as seen in, for example, FIGS. 14A-14E).

As seen in FIGS. 14A-14E, a mold 150 may be utilized for shaping the first barrier layer 102a, the second barrier layer 102b, and the iridescent layer 102c in the form the fluid-filled body 102 defining the forefoot portion 100a during a molding or thermoforming process. In some instances, adhesive bonding or thermal bonding may be utilizing for forming the fluid-filled body 102 during the molding or thermoforming process.

In another example as seen in FIG. 7B, an exemplary forefoot portion 100b is defined by a fluid-filled body 102 derived from a first layer of material defining a first barrier layer 102a, a second layer of material defining a second barrier layer 102b, and a third layer of material defining an iridescent layer 102c. The fluid-filled body 102 defining the forefoot portion 100b is formed by arranging: (1) at least a portion of an upper surface $102b_U$ of the second barrier layer 102b adjacent a lower surface $102a_L$ of the first barrier layer 102a and (2) at least a portion of an upper surface $102a_U$ of the first barrier layer 102a adjacent a lower surface $102c_L$ of the iridescent layer 102c. At least one of the first barrier layer 102a and the second barrier layer 102b may be formed from a polymer material (e.g., a thermoplastic polyurethane (TPU) material). The one or more iridescent layers 102c may be formed from a polymer material (e.g., a polyurethane (PU) material) that provides at least a portion of the fluid-filled body 102 defining the forefoot portion 100b with an iridescent appearance caused by a diffraction of light waves directed toward the fluid-filled body 102.

In some instances, the one or more iridescent layers 102c includes mica. In some examples, the mica is deposited on one or both of an upper surface $102c_U$ and a lower surface $102c_L$ of the one or more iridescent layers 102c. In other examples, the one or more iridescent layers 102c is impregnated with mica.

In some instances, the PU material defining the one or more iridescent layers 102c may be commercially available from Korea Fine Chemical Co., Ltd. and sold under the trade-name Excellon RL. In some examples, the PU material defining the one or more iridescent layers 102c may be defined by one or more of the following characteristics: (1) a thickness approximately equal to 0.15 mm, (2) a shore A hardness of approximately 95, (3) a tensile strength of approximately 275 kgf/cm$^2$, (4) an elongation of approximately 364%, (5) a 300% modulus of approximately 128 kgf/cm$^2$ and (6) a tear strength of approximately 84 kgf/cm. In some embodiments, the PU material defining the one or more iridescent layers 102c may be defined to have about the same stretchability as the TPU material defining at least one of the first barrier layer 102a and the second barrier layer 102b thereby permitting the PU material defining the one or more iridescent layers 102c to be laminated to the TPU material defining at least one of the first barrier layer 102a and the second barrier layer 102b during a manufacturing procedure (e.g., a molding procedure as seen in, for example, FIGS. 14A-14E).

As seen in FIGS. 14A-14E, a mold 150 may be utilized for shaping the first barrier layer 102a, the second barrier layer 102b and the iridescent layer 102c in the form the fluid-filled body 102 defining the forefoot portion 100b during a molding or thermoforming process. In some instances, adhesive bonding or thermal bonding may be utilizing for forming the fluid-filled body 102 during the molding or thermoforming process.

In yet another example as seen in FIG. 7C, an exemplary forefoot portion 100c is defined by a fluid-filled body 102 derived from a first layer of material defining a first barrier layer 102a, a second layer of material defining a second barrier layer 102b and a third layer of material defining an iridescent layer 102c. The fluid-filled body 102 defining the forefoot portion 100c is formed by arranging: (1) at least a portion of an upper surface $102b_U$ of the second barrier layer 102b adjacent a lower surface $102c_L$ of the iridescent layer 102c and (2) at least a portion of an upper surface $102c_U$ of the iridescent layer 102c adjacent a lower surface $102a_L$ of the first barrier layer 102c. At least one of the first barrier layer 102a and the second barrier layer 102b may be formed from a polymer material (e.g., a thermoplastic polyurethane (TPU) material). The one or more iridescent layers 102c may be formed from a polymer material (e.g., a polyurethane (PU) material) that provides at least a portion of the fluid-filled body 102 defining the forefoot portion 100c with an iridescent appearance caused by a diffraction of light waves directed toward the fluid-filled body 102.

In some instances, the one or more iridescent layers 102c includes mica. In some examples, the mica is deposited on one or both of an upper surface $102c_U$ and a lower surface $102c_L$ of the one or more iridescent layers 102c. In other examples, the one or more iridescent layers 102c is impregnated with mica.

In some instances, the PU material defining the one or more iridescent layers 102c may be commercially available from Korea Fine Chemical Co., Ltd. and sold under the trade-name Excellon RL. In some examples, the PU material defining the one or more iridescent layers 102c may be defined by one or more of the following characteristics: (1) a thickness approximately equal to 0.15 mm, (2) a shore A hardness of approximately 95, (3) a tensile strength of approximately 275 kgf/cm$^2$, (4) an elongation of approximately 364%, (5) a 300% modulus of approximately 128 kgf/cm$^2$ and (6) a tear strength of approximately 84 kgf/cm. In some embodiments, the PU material defining the one or more iridescent layers 102c may be defined to have about the same stretchability as the TPU material defining at least one of the first barrier layer 102a and the second barrier layer 102b thereby permitting the PU material defining the one or more iridescent layers 102c to be laminated to the TPU material defining at least one of the first barrier layer 102a and the second barrier layer 102b during a manufacturing procedure (e.g., a molding procedure as seen in, for example, FIGS. 14A-14E).

As seen in FIGS. 14A-14E, a mold 150 may be utilized for shaping the first barrier layer 102a, the second barrier layer 102b and the iridescent layer 102c in the form the fluid-filled body 102 defining the forefoot portion 100c during a molding or thermoforming process. In some instances, adhesive bonding or thermal bonding may be utilizing for forming the fluid-filled body 102 during the molding or thermoforming process.

In an example as seen in FIG. 7D, an exemplary forefoot portion 100d is defined by a fluid-filled body 102 derived from a first layer of material defining a first barrier layer 102a, a second layer of material defining a second barrier layer 102b, a third layer of material defining a first iridescent layer 102c and a fourth layer of material defining a second iridescent layer 102d. The fluid-filled body 102 defining the forefoot portion 100d is formed by arranging: (1) at least a portion of an upper surface $102c_U$ of the first iridescent layer 102c adjacent a lower surface $102b_L$ of the second barrier layer 102b, (2) at least a portion of an upper surface $102b_U$ of the second barrier layer 102b adjacent a lower surface $102a_L$ of the first barrier layer 102c and (3) at least a portion of an upper surface $102a_U$ of the first barrier layer 102a adjacent a lower surface $102d_L$ of the second iridescent layer 102d. At least one of the first barrier layer 102a and the second barrier layer 102b may be formed from a polymer material (e.g., a thermoplastic polyurethane (TPU) material). The one or more iridescent layers 102c, 102d may be formed from a polymer material (e.g., a polyurethane (PU) material) that provides at least a portion of the fluid-filled body 102 defining the forefoot portion 100d with an iridescent appearance caused by a diffraction of light waves directed toward the fluid-filled body 102.

In some instances, the one or more iridescent layers 102c, 102d includes mica. In some examples, the mica is deposited on one or both of an upper surface $102c_U$, $102d_U$ and a lower surface $102c_L$, $102d_L$ of the one or more iridescent layers 102c, 102d. In other examples, the one or more iridescent layers 102c, 102d is impregnated with mica.

In some instances, the PU material defining the one or more iridescent layers 102c may be commercially available from Korea Fine Chemical Co., Ltd. and sold under the trade-name Excellon RL. In some examples, the PU material defining the one or more iridescent layers 102c may be defined by one or more of the following characteristics: (1) a thickness approximately equal to 0.15 mm, (2) a shore A hardness of approximately 95, (3) a tensile strength of approximately 275 kgf/cm$^2$, (4) an elongation of approximately 364%, (5) a 300% modulus of approximately 128 kgf/cm$^2$ and (6) a tear strength of approximately 84 kgf/cm. In some embodiments, the PU material defining the one or more iridescent layers 102c may be defined to have about the same stretchability as the TPU material defining at least one of the first barrier layer 102a and the second barrier layer 102b thereby permitting the PU material defining the one or more iridescent layers 102c to be laminated to the TPU material defining at least one of the first barrier layer 102a and the second barrier layer 102b during a manufacturing procedure (e.g., a molding procedure as seen in, for example, FIGS. 14A-14E).

As seen in FIGS. 14A-14E, a mold 150 may be utilized for shaping the first barrier layer 102a, the second barrier layer 102b, the first iridescent layer 102c and the second iridescent layer 102d in the form the fluid-filled body 102 defining the forefoot portion 100d during a molding or thermoforming process. In some instances, adhesive bonding or thermal bonding may be utilizing for forming the fluid-filled body 102 during the molding or thermoforming process.

In an example as seen in FIG. 7E, an exemplary forefoot portion 100e is defined by a fluid-filled body 102 derived from a first layer of material defining a first barrier layer 102a, a second layer of material defining a second barrier layer 102b, a third layer of material defining a first iridescent layer 102c and a fourth layer of material defining a second iridescent layer 102d. The fluid-filled body 102 defining the forefoot portion 100e is formed by arranging: (1) at least a portion of an upper surface $102c_U$ of the first iridescent layer 102c adjacent a lower surface $102b_L$ of the second barrier layer 102b, (2) at least a portion of an upper surface $102b_U$ of the second barrier layer 102b adjacent a lower surface $102d_L$ of the second iridescent layer 102d and (3) at least a portion of an upper surface $102d_U$ of the second iridescent layer 102d adjacent a lower surface $102a_L$ of the first barrier layer 102a. At least one of the first barrier layer 102a and the second barrier layer 102b may be formed from a polymer material (e.g., a thermoplastic polyurethane (TPU) material). The one or more iridescent layers 102c, 102d may be formed from a polymer material (e.g., a polyurethane (PU) material) that provides at least a portion of the fluid-filled body 102 defining the forefoot portion 100e with an iridescent appearance caused by a diffraction of light waves directed toward the fluid-filled body 102.

In some instances, the one or more iridescent layers 102c, 102d includes mica. In some examples, the mica is deposited on one or both of an upper surface $102c_U$, $102d_U$ and a lower surface $102c_L$, $102d_L$ of the one or more iridescent layers 102c, 102d. In other examples, the one or more iridescent layers 102c, 102d is impregnated with mica.

In some instances, the PU material defining the one or more iridescent layers 102c may be commercially available from Korea Fine Chemical Co., Ltd. and sold under the trade-name Excellon RL. In some examples, the PU material defining the one or more iridescent layers 102c may be defined by one or more of the following characteristics: (1) a thickness approximately equal to 0.15 mm, (2) a shore A hardness of approximately 95, (3) a tensile strength of approximately 275 kgf/cm$^2$, (4) an elongation of approximately 364%, (5) a 300% modulus of approximately 128 kgf/cm$^2$ and (6) a tear strength of approximately 84 kgf/cm. In some embodiments, the PU material defining the one or more iridescent layers 102c may be defined to have about the same stretchability as the TPU material defining at least one of the first barrier layer 102a and the second barrier layer 102b thereby permitting the PU material defining the one or more iridescent layers 102c to be laminated to the TPU material defining at least one of the first barrier layer 102a and the second barrier layer 102b during a manufacturing procedure (e.g., a molding procedure as seen in, for example, FIGS. 14A-14E).

As seen in FIGS. 14A-14E, a mold 150 may be utilized for shaping the first barrier layer 102a, the second barrier layer 102b, the first iridescent layer 102c and the second iridescent layer 102d in the form the fluid-filled body 102 defining the forefoot portion 100e during a molding or thermoforming process. In some instances, adhesive bonding or thermal bonding may be utilizing for forming the fluid-filled body 102 during the molding or thermoforming process.

In another example as seen in FIG. 7F, an exemplary forefoot portion 100f is defined by a fluid-filled body 102 derived from a first layer of material defining a first barrier layer 102a, a second layer of material defining a second barrier layer 102b, a third layer of material defining a first iridescent layer 102c and a fourth layer of material defining a second iridescent layer 102d. The fluid-filled body 102 defining the forefoot portion 100f is formed by arranging: (1) at least a portion of an upper surface $102b_U$ of the second barrier layer 102b adjacent a lower surface $102c_L$ of the first iridescent layer 102c, (2) at least a portion of an upper surface $102c_U$ of the first iridescent layer 102c adjacent a lower surface $102a_L$ of the first barrier layer 102a and (3) at least a portion of an upper surface $102a_U$ of the first barrier layer 102a adjacent a lower surface $102d_L$ of the second iridescent layer 102d. At least one of the first barrier layer 102a and the second barrier layer 102b may be formed from a polymer material (e.g., a thermoplastic polyurethane (TPU) material). The one or more iridescent layers 102c, 102d may be formed from a polymer material (e.g., a polyurethane (PU) material) that provides at least a portion of the fluid-filled body 102 defining the forefoot portion 100f with an iridescent appearance caused by a diffraction of light waves directed toward the fluid-filled body 102.

In some instances, the one or more iridescent layers 102c, 102d includes mica. In some examples, the mica is deposited on one or both of an upper surface $102c_U$, $102d_U$ and a lower surface $102c_L$, $102d_L$ of the one or more iridescent layers 102c, 102d. In other examples, the one or more iridescent layers 102c, 102d is impregnated with mica.

In some instances, the PU material defining the one or more iridescent layers 102c may be commercially available from Korea Fine Chemical Co., Ltd. and sold under the trade-name Excellon RL. In some examples, the PU material defining the one or more iridescent layers 102c may be defined by one or more of the following characteristics: (1) a thickness approximately equal to 0.15 mm, (2) a shore A hardness of approximately 95, (3) a tensile strength of approximately 275 $kgf/cm^2$, (4) an elongation of approximately 364%, (5) a 300% modulus of approximately 128 $kgf/cm^2$ and (6) a tear strength of approximately 84 kgf/cm. In some embodiments, the PU material defining the one or more iridescent layers 102c may be defined to have about the same stretchability as the TPU material defining at least one of the first barrier layer 102a and the second barrier layer 102b thereby permitting the PU material defining the one or more iridescent layers 102c to be laminated to the TPU material defining at least one of the first barrier layer 102a and the second barrier layer 102b during a manufacturing procedure (e.g., a molding procedure as seen in, for example, FIGS. 14A-14E).

As seen in FIGS. 14A-14E, a mold 150 may be utilized for shaping the first barrier layer 102a, the second barrier layer 102b, the first iridescent layer 102c and the second iridescent layer 102d in the form the fluid-filled body 102 defining the forefoot portion 100f during a molding or thermoforming process. In some instances, adhesive bonding or thermal bonding may be utilizing for forming the fluid-filled body 102 during the molding or thermoforming process.

Figure 7G:
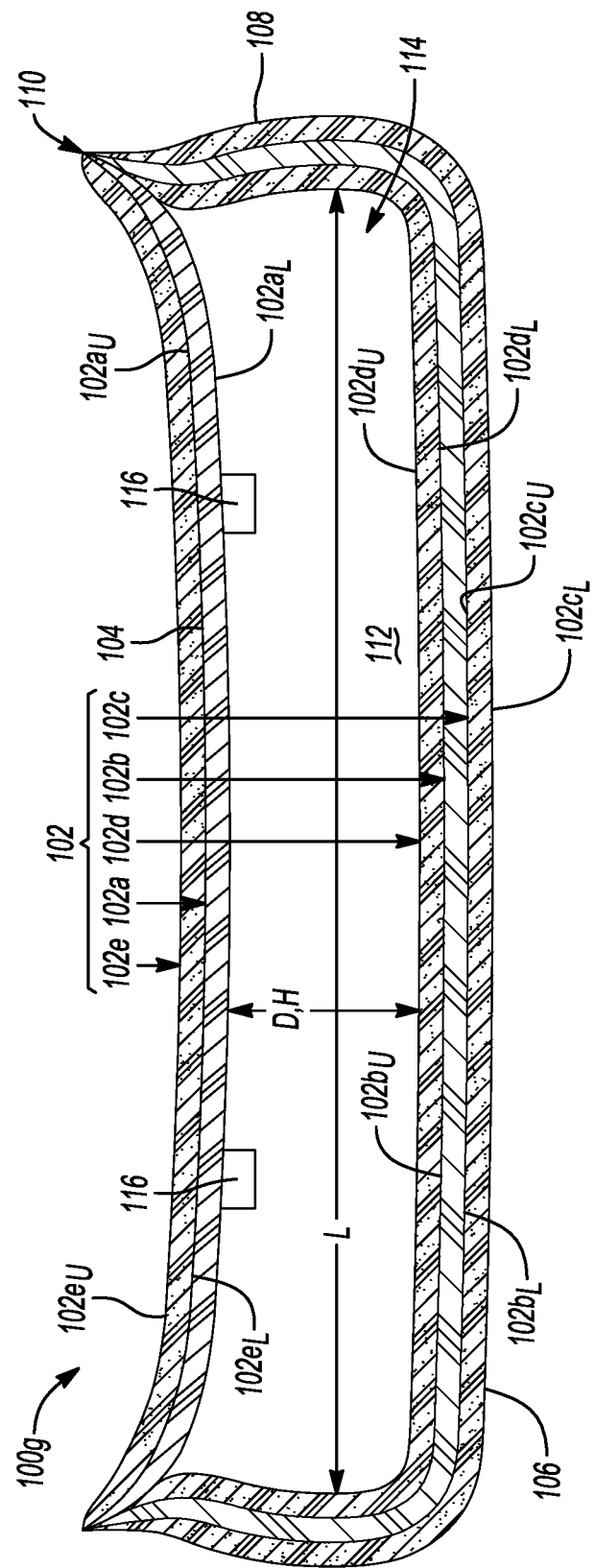

In yet another example as seen in FIG. 7G, an exemplary forefoot portion 100g is defined by a fluid-filled body 102 derived from a first layer of material defining a first barrier layer 102a, a second layer of material defining a second barrier layer 102b, a third layer of material defining a first iridescent layer 102c, a fourth layer of material defining a second iridescent layer 102d, and a fifth layer of material defining a third iridescent layer 102e. The fluid-filled body 102 defining the forefoot portion 100g is formed by arranging: (1) at least a portion of an upper surface $102c_U$ of the first iridescent layer 102c adjacent a lower surface $102b_L$ of the second barrier layer 102b, (2) at least a portion of an upper surface $102b_U$ of the second barrier layer 102b adjacent a lower surface $102d_L$ of the second iridescent layer 102d (3) at least a portion of an upper surface $102d_U$ of the second iridescent layer 102d adjacent a lower surface $102a_L$ of the first barrier layer 102a and (4) at least a portion of an upper surface $102a_U$ of the first barrier layer 102a adjacent a lower surface $102e_L$ of the third iridescent layer 102e. At least one of the first barrier layer 102a and the second barrier layer 102b may be formed from a polymer material (e.g., a thermoplastic polyurethane (TPU) material). The one or more iridescent layers 102c, 102d, 102e may be formed from a polymer material (e.g., a polyurethane (PU) material) that provides at least a portion of the fluid-filled body 102 defining the forefoot portion 100g with an iridescent appearance caused by a diffraction of light waves directed toward the fluid-filled body 102.

In some instances, the one or more iridescent layers 102c, 102d includes mica. In some examples, the mica is deposited on one or both of an upper surface $102c_U$, $102d_U$ and a lower surface $102c_L$, $102d_L$ of the one or more iridescent layers 102c, 102d. In other examples, the one or more iridescent layers 102c, 102d is impregnated with mica.

In some instances, the PU material defining the one or more iridescent layers 102c may be commercially available from Korea Fine Chemical Co., Ltd. and sold under the trade-name Excellon RL. In some examples, the PU material defining the one or more iridescent layers 102c may be defined by one or more of the following characteristics: (1) a thickness approximately equal to 0.15 mm, (2) a shore A hardness of approximately 95, (3) a tensile strength of approximately 275 $kgf/cm^2$, (4) an elongation of approximately 364%, (5) a 300% modulus of approximately 128 $kgf/cm^2$ and (6) a tear strength of approximately 84 kgf/cm. In some embodiments, the PU material defining the one or more iridescent layers 102c may be defined to have about the same stretchability as the TPU material defining at least one of the first barrier layer 102a and the second barrier layer 102b thereby permitting the PU material defining the one or more iridescent layers 102c to be laminated to the TPU material defining at least one of the first barrier layer 102a and the second barrier layer 102b during a manufacturing procedure (e.g., a molding procedure as seen in, for example, FIGS. 14A-14E).

As seen in FIGS. 14A-14E, a mold 150 may be utilized for shaping the first barrier layer 102a, the second barrier layer 102b, the first iridescent layer 102c, the second iridescent layer 102d and the third iridescent layer 102e in the form the fluid-filled body 102 defining the forefoot portion 100g during a molding or thermoforming process. In some instances, adhesive bonding or thermal bonding may be utilizing for forming the fluid-filled body 102 during the molding or thermoforming process.

As seen in FIGS. 3A, 4-5 and 7A, the first barrier layer 102a defines an upper surface 104 of the fluid-filled body 102. Referring to FIGS. 3A, 6 and 7A, the iridescent layer 102c defines a lower surface 106 of the fluid-filled body 102. Furthermore, as seen in FIGS. 3A, 4 and 7A, the iridescent layer 102c defines a side surface 108 of the fluid-filled body 102; the side surface 108 connects the upper surface 104 to the lower surface 106. As seen in FIG. 3A, the upper surface 104 of the fluid-filled body 102 of the forefoot portion 100 is connected to upper portion 12. Optionally, if an outsole portion 36 is included in the design of the article of footwear 10, the outsole portion may, as seen in FIG. 3A, be disposed over some of the lower surface 106 of the fluid-filled body 102 of the forefoot portion 100 such that some of the lower surface 106 is exposed and not obscured by the outsole portion 36.

Referring to FIGS. 3A and 7A, one or more of the three or more layers 102a, 102b, 102c that forms the fluid-filled body 102 contributes to the fluid-filled body 102 defining an outer peripheral flange 110 and one or more internal ribs 112. The one or more internal ribs 112 maintain the first barrier layer 102a and the second barrier layer 102b in a spaced-apart relationship by a distance D such that the fluid-filled body 102 defines a plurality of fluid-filled chambers 114. The plurality of fluid-filled chambers 114 enclose or contain a fluid within forefoot portion 100.

In some examples, as seen in FIGS. 4-6, the one or more internal ribs 112 includes seven internal ribs 112a-112g including a first internal rib 112a, a second internal rib 112b, a third internal rib 112c, a fourth internal rib 112d, a fifth internal rib 112e, a sixth internal rib 112f and a seventh internal rib 112g. In some instances, the one or more (e.g., seven) internal ribs 112 define eight fluid-filled chambers 114a-114h including a first fluid-filled chamber 114a, a second fluid-filled chamber 114b, a third fluid-filled chamber 114c, a fourth fluid-filled chamber 114d, a fifth fluid-filled chamber 114e, a sixth fluid-filled chamber 114f, a seventh fluid-filled chamber 114g and an eighth fluid-filled chamber 114h.

The one or more internal ribs 112 may also form at least one fluid conduit 116 that permits each of the fluid-filled chambers 114a-114h of the plurality of fluid-filled chambers 114 to be in fluid communication with one another. The fluid conduits 116 may be formed along the length of each of the one or more internal ribs 112 and/or at opposite ends of the one or more internal ribs near the outer peripheral flange 110. As such, the fluid conduits 116 may permit the fluid within forefoot portion 100 to be transferred between fluid-filled chambers 114a-114h.

As will be described in the following disclosure at FIGS. 14A-14E, adjacent layers of the one or more of the three or more layers 102a, 102b, 102c that forms the fluid-filled body 102 are joined to each other to form a bond that seals the fluid within the plurality of fluid-filled chambers 114 defined by the fluid-filled body 102 forming the forefoot portion 100. Although the fluid-filled chambers 114a-114h effectively contain the fluid within forefoot portion 100, each of the fluid-filled chambers 114a-114h are placed in fluid communication by way of the fluid conduits 116. In some configurations, one or more of the fluid conduits 116 may not be formed by the one or more internal ribs 112 in order to segregate the fluid in one of fluid-filled chambers 114a-114h from the fluid in another fluid-filled chamber 114a-114h; in such instances, the fluid provided in the segregated fluid-filled chambers 114a-114h may be pressurized differently. In other configurations, the forefoot portion 100 may be a part of a fluid system that, for example, pumps fluid into the fluid-filled chambers 114a-114h to tailor the pressure within the forefoot portion 100 to the preferences or running style of the wearer.

Referring to FIGS. 3A and 7A, the upper surface 104 may have a generally concave, rounded and relatively smooth profile that supports the foot when the article of footwear 10 is worn. In an example, the rounded configuration of upper surface 104 lays on a curved plane that is cooperatively formed by: (1) the fluid-filled chambers 114a-114h; (2) the outer peripheral flange 110; and (3) the fluid conduits 116. In contrast, the lower surface 106 may be more contoured, with the fluid-filled chambers 114a-114h extending or protruding downward from the outer peripheral flange 110. As a result, portions of the fluid-filled chambers 114a-114h may protrude downwardly to form independent supports or cushioning elements in the sole portion 14.

In some implementations, undulations or other discontinuities formed by the upper surface 104, which supports the foot, that are greater than, for example, one (1) millimeter may decrease footwear comfort. The pressure of the fluid within the fluid-filled chambers 114a-114h tend to press outward upon the first barrier layer 102a that forms the upper surface 104 and the iridescent layer 102c that forms the lower surface 106, which may cause areas of forefoot portion 100 corresponding with fluid-filled chambers 114a-114h to bulge or protrude outward. Although the upper surface 104 may exhibit some undulations adjacent to the fluid-filled chambers 114a-114h, the size of these undulations may be generally limited to less than, for example, one (1) millimeter, thereby enhancing the comfort of the article of footwear 10.

Various features of forefoot portion 100 may operate cooperatively to limit the size of the undulations in the upper surface 104. Exemplary features may include, for example: (1) a thickness of any of the first barrier layer 102a; the second barrier layer 102b and the iridescent layer 102c that contribute to the formation of the fluid-filled chambers 114a-114h, (2) the pressure of the fluid within the fluid-filled chambers 114a-114h; and (3) the width of the fluid-filled chambers 114a-114h. In general, as the thickness of any of the first barrier layer 102a, the second barrier layer 102b and the iridescent layer 102c that contribute to the formation of any of the fluid-filled chambers 114a-114h increases, or, as the pressure of the fluid within the fluid-filled chambers 114a-114h decreases, the degree to which the fluid-filled chambers 114a-114h bulge or protrude outward and form undulations decreases. For footwear applications, in some instances, any of the first barrier layer 102a, the second barrier layer 102b and the iridescent layer 102c may be defined by a thickness of three-quarters of a (0.75) millimeter (e.g., 0.03 inch) and a fluid pressure of 138 kilopascals (20 pounds per square inch) within the fluid-filled chambers 114a-114h provides a suitable degree of compliance, force attenuation, and other properties. Given the above-described exemplary thickness and pressure, having a maximum width of less than fourteen (14) millimeters, and possibly less than twelve (12) millimeters, in the fluid-filled chambers 114a-114h may limit the size of the undulations formed by the upper surface 104 to less than, for example, one (1) millimeter. While the iridescent layer 102c is described as including a similar thickness as the first and second barrier layers 102a, 102b, the iridescent layer 102c may include a much smaller thickness in comparison to the thickness of the layers 102a, 102b. For example, the iridescent layer 102c may include a thickness that is less than one millimeter (1 mm). In one example, the iridescent layer 102c includes a thickness of 0.18 mm.

In the configuration shown in FIGS. 5 and 6, adjacent internal ribs 112a-112g of the one or more internal ribs 112 may be arranged in a substantially parallel relationship. Furthermore in some examples, adjacent internal ribs 112a-112g of the one or more internal ribs 112 may be spaced apart by a width W such that each fluid-filled chamber 114a-114h of the plurality of fluid-filled chambers 114 are arranged in a substantially parallel relationship. In some instances, the width W may be defined by a maximum width of less than fourteen (14) millimeters. In some examples, the width W may be defined by a maximum width of less than twelve (12) millimeters. In other examples, the width W may be defined by a maximum width greater than fourteen (14) millimeters.

Although exemplary dimensions of the width W of the fluid-filled chambers 114a-114h have been described above, the exemplary dimensions of the width W may be limited to less than fourteen (14) or twelve (12) millimeters, and, as such, a height dimension H (see, e.g., FIG. 7A) and a length dimension L (see, e.g., FIG. 7A) of the fluid-filled chambers 114a-114h may vary considerably. In general, and, with all other factors being the same, as the volume of each of the fluid-filled chambers 114a-114h increases, the degree of cushioning or force attenuation provided by forefoot portion 100 also increases. By maximizing the height H and length L of portions or segments of the fluid-filled chambers 114a-114h, cushioning or force attenuation properties may also be enhanced. As an example, in some configurations of forefoot portion 100, the height H of fluid-filled chambers 114a-114h may be more than fourteen (14) millimeters, with the height H being measured in a direction that is perpendicular to the width W.

The outer peripheral flange 110 forms a peripheral seam or bonded area that joins the first barrier layer 102a, the second barrier layer 102b, and the iridescent layer 102c and assists with sealing the fluid within forefoot portion 100. In general, the outer peripheral flange 110 may be defined by a height of at least five (5) millimeters and extends in an outward direction from a remainder of forefoot portion 100. Relative to the voids that contain the fluid within the fluid-filled chambers 114a-114h, the outer peripheral flange 110 extends outward from the voids. More particularly, the outer peripheral flange 110 extends in an upward direction from the peripheral area or an upper area of forefoot portion 100 whereas the area of outer peripheral flange 110 extending from the upper surface 104 faces toward and is secured to upper portion 12 while the area of outer peripheral flange 110 extending toward the lower surface 106 forms a portion of the side surface 108 of the article of footwear 10. Given that outer peripheral flange 110 is a relatively thick and stiff portion of forefoot portion 100, the outer peripheral flange 110 may enhance the stability of the article of footwear 10. The outer peripheral flange 110 may also provide a defined lasting margin during steps of the manufacturing process that involve bonding upper portion 12 to forefoot portion 100.

Referring to FIG. 7A, the outer peripheral flange 110 is depicted as having a tapered configuration, with the portions of the outer peripheral flange 110 located adjacent to the voids of the fluid-filled chambers 114a-114h having greater thickness than the portions of the outer peripheral flange 110 that are spaced from the voids and form a distal end. In effect, therefore, the outer peripheral flange 110 may have a tapered configuration with a first thickness adjacent to the voids and a second thickness spaced away from the voids whereby the first thickness is greater than the second thickness. Moreover, thickness of the portions of the outer peripheral flange 110 located adjacent to the voids (i.e., the first thickness) may be greater than the sum of the thicknesses of any of the first barrier layer 102a, the second barrier layer 102b, and the iridescent layer 102c forming the upper surface 104 and the lower surface 106. As noted above, the outer peripheral flange 110 may be a relatively thick and stiff portion of forefoot portion 100; a portion of the stiffness may be due, therefore, to a greater thickness of the outer peripheral flange 110 adjacent to the fluid-filled chambers 114a-114h. A process for forming the outer peripheral flange 110 to have this configuration is discussed in the following disclosure at FIGS. 14A-14E.

Although the outer peripheral flange 110 is present in areas adjacent to the fluid-filled chambers 114a-114h, the outer peripheral flange 110 may be absent or have minimal height and thickness in some areas between the fluid-filled chambers 114a-114h. This configuration may provide enhanced flexibility to the forefoot portion 100. More particularly, given that the outer peripheral flange 110 may be a relatively thick and stiff portion of the forefoot portion 100, areas where the outer peripheral flange 110 are absent or minimized may have greater flexibility.

Various factors may be considered when selecting materials for any of the first barrier layer 102a, the second barrier layer 102b and the iridescent layer 102c forming the forefoot portion 100. As an example, the engineering properties of the materials (e.g., tensile strength, tear strength, flexural fatigue strength, modulus of elasticity, and abrasion resistance) may be considered. The ability of the materials to be shaped into the fluid-filled chambers 114a-114h and bonded to form the outer peripheral flange 110 during the manufacture of forefoot portion 100 may also be considered. Additionally, the ability of the materials to prevent the transmission (e.g., diffusion, permeation) of the fluid contained by forefoot portion 100 may be considered. Suitable materials for forefoot portion 100 include a variety of thermoset and thermoplastic polymer materials. An advantage of thermoplastic polymer materials is that they may be molded (e.g., thermoformed) to impart the shapes of the fluid-filled chambers 114a-114h and the outer peripheral flange 110. Moreover, thermoplastic polymer materials may be thermal bonded to each other to form the outer peripheral flange 110. Given these considerations, examples of polymer materials that may be utilized for the forefoot portion 100 include any of the following: polyurethane, urethane, thermoplastic polyurethane, polyester, polyester polyurethane, polyether, polyether polyurethane, latex, polycaprolactone, polyoxypropylene, polycarbonate macroglycol, and mixtures thereof.

Although any of the materials noted above may be utilized for the forefoot portion 100, various materials exhibit both diffusion-prevention and thermoplastic properties. Although various configurations may be utilized, this material generally includes layers of a thermoplastic polymer material and a barrier material. The thermoplastic polymer material provides the ability to form contoured shapes and thermal bonds, as well as a suitable degree of tensile strength, tear strength, flexural fatigue strength, modulus of elasticity, and abrasion resistance. The barrier material is effective in limiting the transmission of the fluid within the forefoot portion 100 (e.g., air, nitrogen, or sulfurhexafluoride). As another example, the forefoot portion 100 may be formed from other layered materials, including a flexible microlayer membrane that has alternating layers of a gas barrier material and an elastomeric material. Further suitable materials include thermoplastic films containing a crystalline material. Another suitable material may be a polyurethane material including a polyester polyol.

Figure 8:
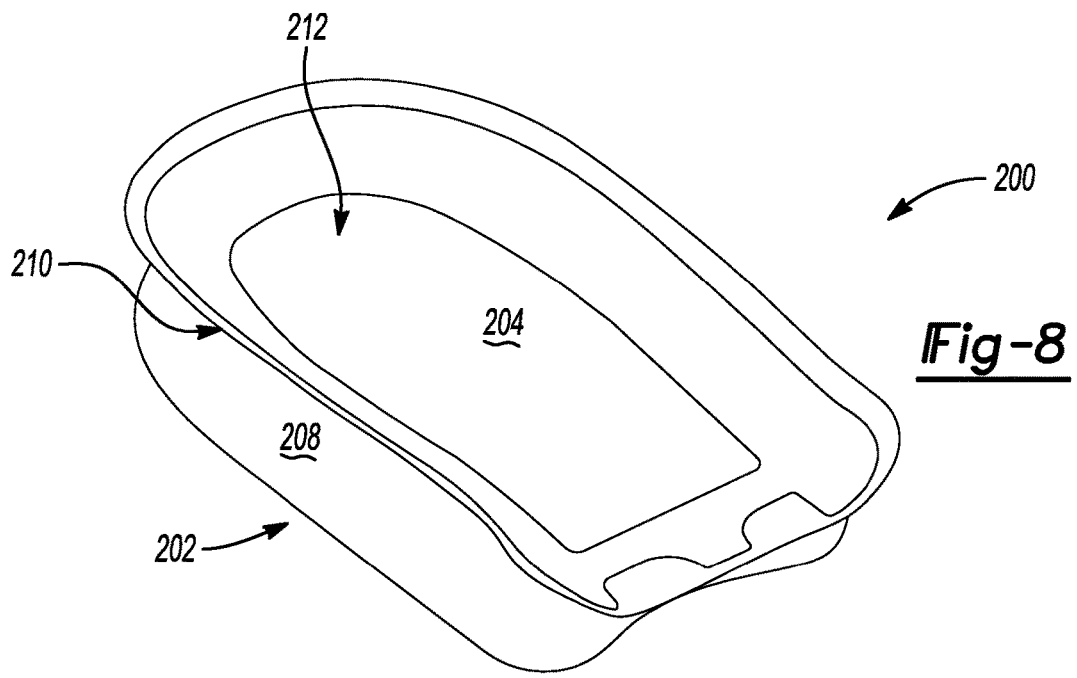
FIG. 8 is a perspective view of an exemplary heel portion of the article of footwear of FIGS. 1-2.
Figures 9, 10:
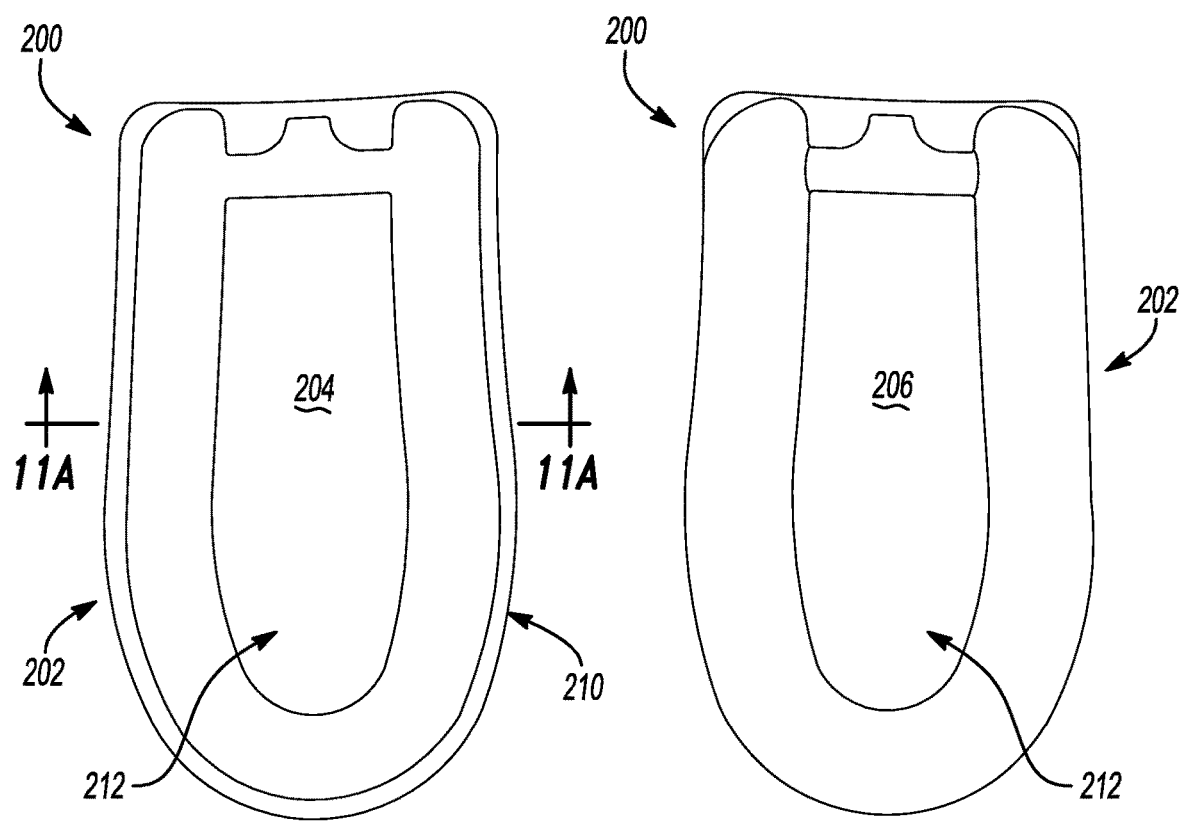
FIG. 9 is a top plan view of the heel portion of FIG. 8.
FIG. 10 is a bottom plan view of the heel portion of FIG. 8.

Referring to FIGS. 8-10, the exemplary heel portion 200 is shown separate from the article of footwear 10. A cross-sectional view of an exemplary heel portion (referenced from the heel portion 200 of FIGS. 8-10) is shown generally at 200a in FIG. 11A. The exemplary heel portion 200a is also represented as a portion of the article of footwear 10 in FIG. 3B, and, furthermore, a method for manufacturing the exemplary heel portion 200a is also described in the following disclosure at FIGS. 17A-17D. Although a structural configuration of the heel portion 200 as represented by the cross-sectional views of FIGS. 3B, 11A and 17A-17D is shown, the exemplary heel portion 200a should not be interpreted as a limiting structural configuration of the heel portion 200, alone, or, an article of footwear 10 incorporating the heel portion 200. Accordingly, the heel portion 200, or, an article of footwear 10 including the heel portion 200 may include alternative structural configurations as seen and described in, but not limited to, exemplary heel portions seen generally at 200b, 200c, 200d, 200e, 200f and 200g in FIGS. 11B, 11C, 11D, 11E, 11F and 11G, respectively.

Referring to FIGS. 8-10, the heel portion 200 may define an exemplary fluid-filled body 202 derived from three or more layers of material. In an example, the three or more layers of material may include two or more barrier layers and one or more iridescent layers.

Figure 17A:
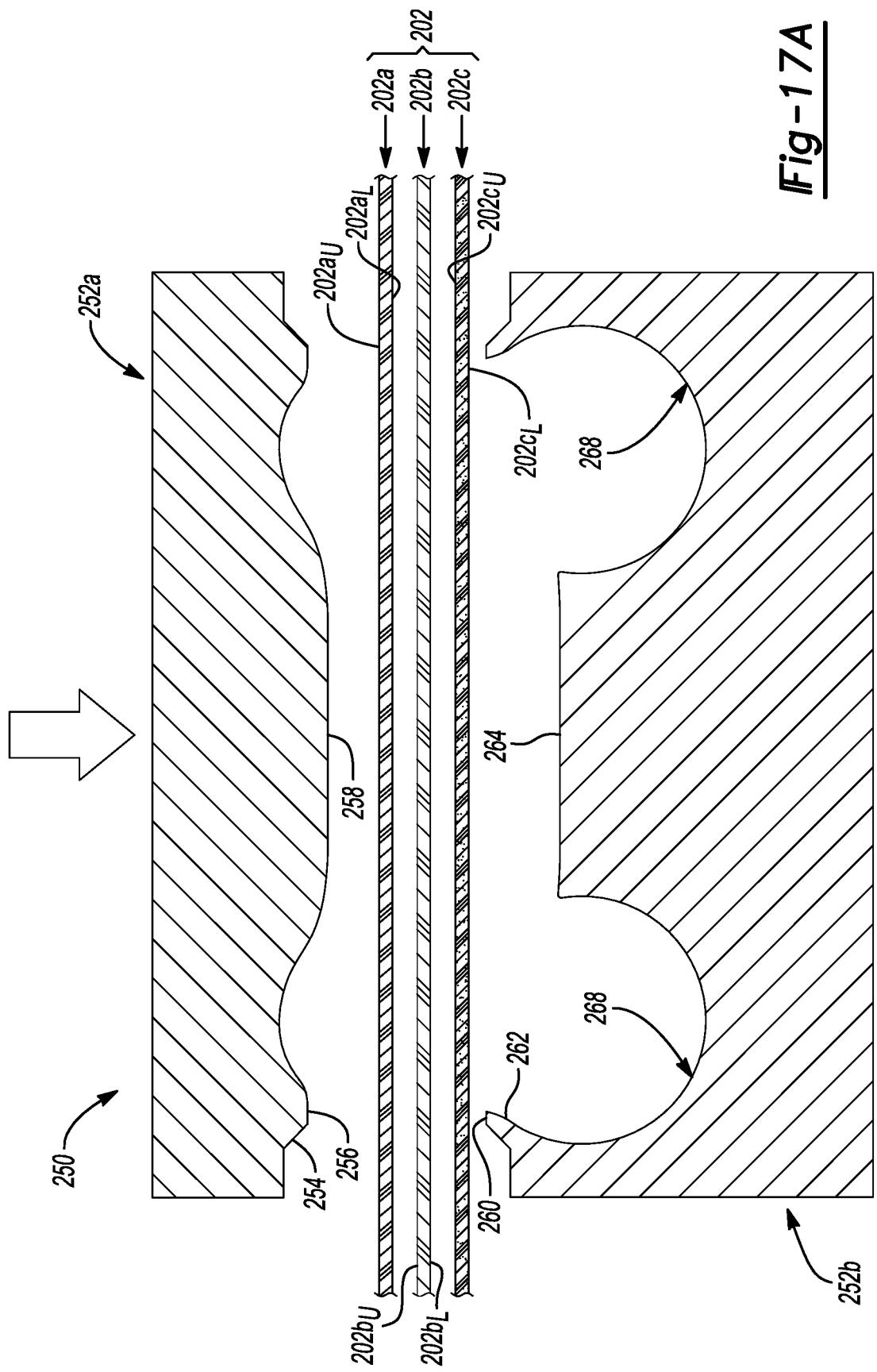

In one example as seen in FIGS. 11A and 17A, the exemplary heel portion 200a is defined by a fluid-filled body 202 derived from a first layer of material defining a first barrier layer 202a, a second layer of material defining a second barrier layer 202b and a third layer of material defining an iridescent layer 202c. With reference to FIG. 11A, the fluid-filled body 202 defining the heel portion 200a is formed by arranging: (1) at least a portion of an upper surface $202c_U$ of the iridescent layer 202c adjacent a lower surface $202b_L$ of the second barrier layer 202b and (2) at least a portion of an upper surface $202b_U$ of the second barrier layer 202b adjacent a lower surface $202a_L$ of the first barrier layer 202a. At least one of the first barrier layer 202a and the second barrier layer 202b may be formed from a polymer material (e.g., a thermoplastic polyurethane (TPU) material). The one or more iridescent layers 202c may be formed from a polymer material (e.g., a polyurethane (PU) material) that provides at least a portion of the fluid-filled body 202 defining the heel portion 200a with an iridescent appearance caused by a diffraction of light waves directed toward the fluid-filled body 202.

In some instances, the one or more iridescent layers 202c includes mica. In some examples, the mica is deposited on one or both of an upper surface $202c_U$ and a lower surface $202c_L$ of the one or more iridescent layers 202c. In other examples, the one or more iridescent layers 202c is impregnated with mica.

In some instances, the PU material defining the one or more iridescent layers 202c may be commercially available from Korea Fine Chemical Co., Ltd. and sold under the trade-name Excellon RL. In some examples, the PU material defining the one or more iridescent layers 202c may be defined by one or more of the following characteristics: (1) a thickness approximately equal to 0.15 mm, (2) a shore A hardness of approximately 95, (3) a tensile strength of approximately 275 kgf/cm$^2$, (4) an elongation of approximately 364%, (5) a 300% modulus of approximately 128 kgf/cm$^2$ and (6) a tear strength of approximately 84 kgf/cm. In some embodiments, the PU material defining the one or more iridescent layers 202c may be defined to have about the same stretchability as the TPU material defining at least one of the first barrier layer 202a and the second barrier layer 202b thereby permitting the PU material defining the one or more iridescent layers 202c to be laminated to the TPU material defining at least one of the first barrier layer 202a and the second barrier layer 202b during a manufacturing procedure (e.g., a molding procedure as seen in, for example, FIGS. 17A-17D).

As seen in FIGS. 17A-17D, the first barrier layer 202a, the second barrier layer 202b and the iridescent layer 202c are shaped to form the fluid-filled body 202 during a molding or thermoforming process. In some instances, adhesive bonding or thermal bonding may be utilizing for forming the fluid-filled body 202 during the molding or thermoforming process.

In another example as seen in FIG. 11B, an exemplary heel portion 200b is defined by a fluid-filled body 202 derived from a first layer of material defining a first barrier layer 202a, a second layer of material defining a second barrier layer 202b and a third layer of material defining an iridescent layer 202c. The fluid-filled body 202 defining the heel portion 200b is formed by arranging: (1) at least a portion of an upper surface $202b_U$ of the second barrier layer 202b adjacent a lower surface $202a_L$ of the first barrier layer 202a and (2) at least a portion of an upper surface $202a_U$ of the first barrier layer 202a adjacent a lower surface $202c_L$ of the iridescent layer 202c. At least one of the first barrier layer 202a and the second barrier layer 202b may be formed from a polymer material (e.g., a thermoplastic polyurethane (TPU) material). The one or more iridescent layers 202c may be formed from a polymer material (e.g., a polyurethane (PU) material) that provides at least a portion of the fluid-filled body 202 defining the heel portion 200b with an iridescent appearance caused by a diffraction of light waves directed toward the fluid-filled body 202.

In some instances, the one or more iridescent layers 202c includes mica. In some examples, the mica is deposited on one or both of an upper surface $202c_U$ and a lower surface $202c_L$ of the one or more iridescent layers 202c. In other examples, the one or more iridescent layers 202c is impregnated with mica.

In some instances, the PU material defining the one or more iridescent layers 202c may be commercially available from Korea Fine Chemical Co., Ltd. and sold under the trade-name Excellon RL. In some examples, the PU material defining the one or more iridescent layers 202c may be defined by one or more of the following characteristics: (1) a thickness approximately equal to 0.15 mm, (2) a shore A hardness of approximately 95, (3) a tensile strength of approximately 275 kgf/cm$^2$, (4) an elongation of approximately 364%, (5) a 300% modulus of approximately 128 kgf/cm$^2$ and (6) a tear strength of approximately 84 kgf/cm. In some embodiments, the PU material defining the one or more iridescent layers 202c may be defined to have about the same stretchability as the TPU material defining at least one of the first barrier layer 202a and the second barrier layer 202b thereby permitting the PU material defining the one or more iridescent layers 202c to be laminated to the TPU material defining at least one of the first barrier layer 202a and the second barrier layer 202b during a manufacturing procedure (e.g., a molding procedure as seen in, for example, FIGS. 17A-17D).

As seen in FIGS. 17A-17E, a mold 250 may be utilized for shaping the first barrier layer 202a, the second barrier layer 202b and the iridescent layer 202c in the form the fluid-filled body 202 defining the forefoot portion 200b during a molding or thermoforming process. In some instances, adhesive bonding or thermal bonding may be utilizing for forming the fluid-filled body 202 during the molding or thermoforming process.

In yet another example as seen in FIG. 11C, an exemplary heel portion 200c is defined by a fluid-filled body 202 derived from a first layer of material defining a first barrier layer 202a, a second layer of material defining a second barrier layer 202b and a third layer of material defining an iridescent layer 202c. The fluid-filled body 202 defining the heel portion 200c is formed by arranging: (1) at least a portion of an upper surface $202b_U$ of the second barrier layer 202b adjacent a lower surface $202c_L$ of the iridescent layer 202c and (2) at least a portion of an upper surface $202c_U$ of the iridescent layer 202c adjacent a lower surface $202a_L$ of the first barrier layer 202c. At least one of the first barrier layer 202a and the second barrier layer 202b may be formed from a polymer material (e.g., a thermoplastic polyurethane (TPU) material). The one or more iridescent layers 202c may be formed from a polymer material (e.g., a polyurethane (PU) material) that provides at least a portion of the fluid-filled body 202 defining the heel portion 200c with an iridescent appearance caused by a diffraction of light waves directed toward the fluid-filled body 202.

In some instances, the one or more iridescent layers 202c includes mica. In some examples, the mica is deposited on one or both of an upper surface $202c_U$ and a lower surface $202c_L$ of the one or more iridescent layers 202c. In other examples, the one or more iridescent layers 202c is impregnated with mica.

In some instances, the PU material defining the one or more iridescent layers 202c may be commercially available from Korea Fine Chemical Co., Ltd. and sold under the trade-name Excellon RL. In some examples, the PU material defining the one or more iridescent layers 202c may be defined by one or more of the following characteristics: (1) a thickness approximately equal to 0.15 mm, (2) a shore A hardness of approximately 95, (3) a tensile strength of approximately 275 kgf/cm², (4) an elongation of approximately 364%, (5) a 300% modulus of approximately 128 kgf/cm² and (6) a tear strength of approximately 84 kgf/cm. In some embodiments, the PU material defining the one or more iridescent layers 202c may be defined to have about the same stretchability as the TPU material defining at least one of the first barrier layer 202a and the second barrier layer 202b thereby permitting the PU material defining the one or more iridescent layers 202c to be laminated to the TPU material defining at least one of the first barrier layer 202a and the second barrier layer 202b during a manufacturing procedure (e.g., a molding procedure as seen in, for example, FIGS. 17A-17D).

As seen in FIGS. 17A-17E, a mold 250 may be utilized for shaping the first barrier layer 202a, the second barrier layer 202b and the iridescent layer 202c in the form the fluid-filled body 202 defining the forefoot portion 200c during a molding or thermoforming process. In some instances, adhesive bonding or thermal bonding may be utilizing for forming the fluid-filled body 202 during the molding or thermoforming process.

In an example as seen in FIG. 11D, an exemplary heel portion 200d is defined by a fluid-filled body 202 derived from a first layer of material defining a first barrier layer 202a, a second layer of material defining a second barrier layer 202b, a third layer of material defining a first iridescent layer 202c and a fourth layer of material defining a second iridescent layer 202d. The fluid-filled body 202 defining the heel portion 200d is formed by arranging: (1) at least a portion of an upper surface $202c_U$ of the first iridescent layer 202c adjacent a lower surface $202b_L$ of the second barrier layer 202b, (2) at least a portion of an upper surface $202b_U$ of the second barrier layer 202b adjacent a lower surface $202a_L$ of the first barrier layer 202c and (3) at least a portion of an upper surface $202a_U$ of the first barrier layer 202a adjacent a lower surface $202d_L$ of the second iridescent layer 202d. At least one of the first barrier layer 202a and the second barrier layer 202b may be formed from a polymer material (e.g., a thermoplastic polyurethane (TPU) material). The one or more iridescent layers 202c, 202d may be formed from a polymer material (e.g., a polyurethane (PU) material) that provides at least a portion of the fluid-filled body 202 defining the heel portion 200d with an iridescent appearance caused by a diffraction of light waves directed toward the fluid-filled body 202.

In some instances, the one or more iridescent layers 202c, 202d includes mica. In some examples, the mica is deposited on one or both of an upper surface $202c_U$, $202d_U$ and a lower surface $202c_L$, $202d_L$ of the one or more iridescent layers 202c, 202d. In other examples, the one or more iridescent layers 202c, 202d is impregnated with mica.

In some instances, the PU material defining the one or more iridescent layers 202c may be commercially available from Korea Fine Chemical Co., Ltd. and sold under the trade-name Excellon RL. In some examples, the PU material defining the one or more iridescent layers 202c may be defined by one or more of the following characteristics: (1) a thickness approximately equal to 0.15 mm, (2) a shore A hardness of approximately 95, (3) a tensile strength of approximately 275 kgf/cm², (4) an elongation of approximately 364%, (5) a 300% modulus of approximately 128 kgf/cm² and (6) a tear strength of approximately 84 kgf/cm. In some embodiments, the PU material defining the one or more iridescent layers 202c may be defined to have about the same stretchability as the TPU material defining at least one of the first barrier layer 202a and the second barrier layer 202b thereby permitting the PU material defining the one or more iridescent layers 202c to be laminated to the TPU material defining at least one of the first barrier layer 202a and the second barrier layer 202b during a manufacturing procedure (e.g., a molding procedure as seen in, for example, FIGS. 17A-17D).

As seen in FIGS. 17A-17E, a mold 250 may be utilized for shaping the first barrier layer 202a, the second barrier layer 202b, the first iridescent layer 202c and the second iridescent layer 202d in the form the fluid-filled body 202 defining the forefoot portion 200d during a molding or thermoforming process. In some instances, adhesive bonding or thermal bonding may be utilizing for forming the fluid-filled body 202 during the molding or thermoforming process.

In an example as seen in FIG. 11E, an exemplary heel portion 200e is defined by a fluid-filled body 202 derived from a first layer of material defining a first barrier layer 202a, a second layer of material defining a second barrier layer 202b, a third layer of material defining a first iridescent layer 202c and a fourth layer of material defining a second iridescent layer 202d. The fluid-filled body 202 defining the heel portion 200e is formed by arranging: (1) at least a portion of an upper surface $202c_U$ of the first iridescent layer 202c adjacent a lower surface $202b_L$ of the second barrier layer 202b, (2) at least a portion of an upper surface $202b_U$ of the second barrier layer 202b adjacent a lower surface $202d_L$ of the second iridescent layer 202d and (3) at least a portion of an upper surface $202d_U$ of the second iridescent layer 202d adjacent a lower surface $202a_L$ of the first barrier layer 202a. At least one of the first barrier layer 202a and the second barrier layer 202b may be formed from a polymer material (e.g., a thermoplastic polyurethane (TPU) material). The one or more iridescent layers 202c, 202d may be formed from a polymer material (e.g., a polyurethane (PU) material) that provides at least a portion of the fluid-filled body 202 defining the heel portion 200e with an iridescent appearance caused by a diffraction of light waves directed toward the fluid-filled body 202.

In some instances, the one or more iridescent layers 202c, 202d includes mica. In some examples, the mica is deposited on one or both of an upper surface $202c_U$, $202d_U$ and a lower surface $202c_L$, $202d_L$ of the one or more iridescent layers 202c, 202d. In other examples, the one or more iridescent layers 202c, 202d is impregnated with mica.

In some instances, the PU material defining the one or more iridescent layers 202c may be commercially available from Korea Fine Chemical Co., Ltd. and sold under the trade-name Excellon RL. In some examples, the PU material defining the one or more iridescent layers 202c may be defined by one or more of the following characteristics: (1) a thickness approximately equal to 0.15 mm, (2) a shore A hardness of approximately 95, (3) a tensile strength of approximately 275 kgf/cm², (4) an elongation of approximately 364%, (5) a 300% modulus of approximately 128 kgf/cm² and (6) a tear strength of approximately 84 kgf/cm.

In some embodiments, the PU material defining the one or more iridescent layers 202c may be defined to have about the same stretchability as the TPU material defining at least one of the first barrier layer 202a and the second barrier layer 202b thereby permitting the PU material defining the one or more iridescent layers 202c to be laminated to the TPU material defining at least one of the first barrier layer 202a and the second barrier layer 202b during a manufacturing procedure (e.g., a molding procedure as seen in, for example, FIGS. 17A-17D).

As seen in FIGS. 17A-17E, a mold 250 may be utilized for shaping the first barrier layer 202a, the second barrier layer 202b, the first iridescent layer 202c and the second iridescent layer 202d in the form the fluid-filled body 202 defining the forefoot portion 200e during a molding or thermoforming process. In some instances, adhesive bonding or thermal bonding may be utilizing for forming the fluid-filled body 202 during the molding or thermoforming process.

In another example as seen in FIG. 11F, an exemplary heel portion 200f is defined by a fluid-filled body 202 derived from a first layer of material defining a first barrier layer 202a, a second layer of material defining a second barrier layer 202b, a third layer of material defining a first iridescent layer 202c and a fourth layer of material defining a second iridescent layer 202d. The fluid-filled body 202 defining the heel portion 200f is formed by arranging: (1) at least a portion of an upper surface $202b_U$ of the second barrier layer 202b adjacent a lower surface $202c_L$ of the first iridescent layer 202c, (2) at least a portion of an upper surface $202c_U$ of the first iridescent layer 202c adjacent a lower surface $202a_L$ of the first barrier layer 202a and (3) at least a portion of an upper surface $202a_U$ of the first barrier layer 202a adjacent a lower surface $202d_L$ of the second iridescent layer 202d. At least one of the first barrier layer 202a and the second barrier layer 202b may be formed from a polymer material (e.g., a thermoplastic polyurethane (TPU) material). The one or more iridescent layers 202c, 202d may be formed from a polymer material (e.g., a polyurethane (PU) material) that provides at least a portion of the fluid-filled body 202 defining the heel portion 200f with an iridescent appearance caused by a diffraction of light waves directed toward the fluid-filled body 202.

In some instances, the one or more iridescent layers 202c, 202d includes mica. In some examples, the mica is deposited on one or both of an upper surface $202c_U$, $202d_U$ and a lower surface $202c_L$, $202d_L$ of the one or more iridescent layers 202c, 202d. In other examples, the one or more iridescent layers 202c, 202d is impregnated with mica.

In some instances, the PU material defining the one or more iridescent layers 202c may be commercially available from Korea Fine Chemical Co., Ltd. and sold under the trade-name Excellon RL. In some examples, the PU material defining the one or more iridescent layers 202c may be defined by one or more of the following characteristics: (1) a thickness approximately equal to 0.15 mm, (2) a shore A hardness of approximately 95, (3) a tensile strength of approximately 275 kgf/cm$^2$, (4) an elongation of approximately 364%, (5) a 300% modulus of approximately 128 kgf/cm$^2$ and (6) a tear strength of approximately 84 kgf/cm. In some embodiments, the PU material defining the one or more iridescent layers 202c may be defined to have about the same stretchability as the TPU material defining at least one of the first barrier layer 202a and the second barrier layer 202b thereby permitting the PU material defining the one or more iridescent layers 202c to be laminated to the TPU material defining at least one of the first barrier layer 202a and the second barrier layer 202b during a manufacturing procedure (e.g., a molding procedure as seen in, for example, FIGS. 17A-17D).

As seen in FIGS. 17A-17E, a mold 250 may be utilized for shaping the first barrier layer 202a, the second barrier layer 202b, the first iridescent layer 202c and the second iridescent layer 202d in the form the fluid-filled body 202 defining the forefoot portion 200f during a molding or thermoforming process. In some instances, adhesive bonding or thermal bonding may be utilizing for forming the fluid-filled body 202 during the molding or thermoforming process.

In yet another example as seen in FIG. 11G, an exemplary heel portion 200g is defined by a fluid-filled body 202 derived from a first layer of material defining a first barrier layer 202a, a second layer of material defining a second barrier layer 202b, a third layer of material defining a first iridescent layer 202c, a fourth layer of material defining a second iridescent layer 202d and a fifth layer of material defining a third iridescent layer 202e. The fluid-filled body 202 defining the heel portion 200g is formed by arranging: (1) at least a portion of an upper surface $202c_U$ of the first iridescent layer 202c adjacent a lower surface $202b_L$ of the second barrier layer 202b, (2) at least a portion of an upper surface $202b_U$ of the second barrier layer 202b adjacent a lower surface $202d_L$ of the second iridescent layer 202d (3) at least a portion of an upper surface $202d_U$ of the second iridescent layer 202d adjacent a lower surface $202a_L$ of the first barrier layer 202a and (4) at least a portion of an upper surface $202a_U$ of the first barrier layer 202a adjacent a lower surface $202e_L$ of the third iridescent layer 202e. At least one of the first barrier layer 202a and the second barrier layer 202b may be formed from a polymer material (e.g., a thermoplastic polyurethane (TPU) material). The one or more iridescent layers 202c, 202d, 202e may be formed from a polymer material (e.g., a polyurethane (PU) material) that provides at least a portion of the fluid-filled body 202 defining the heel portion 200g with an iridescent appearance caused by a diffraction of light waves directed toward the fluid-filled body 202.

In some instances, the one or more iridescent layers 202c, 202d includes mica. In some examples, the mica is deposited on one or both of an upper surface $202c_U$, $202d_U$ and a lower surface $202c_L$, $202d_L$ of the one or more iridescent layers 202c, 202d. In other examples, the one or more iridescent layers 202c, 202d is impregnated with mica.

In some instances, the PU material defining the one or more iridescent layers 202c may be commercially available from Korea Fine Chemical Co., Ltd. and sold under the trade-name Excellon RL. In some examples, the PU material defining the one or more iridescent layers 202c may be defined by one or more of the following characteristics: (1) a thickness approximately equal to 0.15 mm, (2) a shore A hardness of approximately 95, (3) a tensile strength of approximately 275 kgf/cm$^2$, (4) an elongation of approximately 364%, (5) a 300% modulus of approximately 128 kgf/cm$^2$ and (6) a tear strength of approximately 84 kgf/cm. In some embodiments, the PU material defining the one or more iridescent layers 202c may be defined to have about the same stretchability as the TPU material defining at least one of the first barrier layer 202a and the second barrier layer 202b thereby permitting the PU material defining the one or more iridescent layers 202c to be laminated to the TPU material defining at least one of the first barrier layer 202a and the second barrier layer 202b during a manufacturing procedure (e.g., a molding procedure as seen in, for example, FIGS. 17A-17D).

As seen in FIGS. 17A-17E, a mold 250 may be utilized for shaping the first barrier layer 202a, the second barrier layer 202b, the first iridescent layer 202c, the second iridescent layer 202d and the third iridescent layer 202e in the form the fluid-filled body 202 defining the forefoot portion 200g during a molding or thermoforming process. In some instances, adhesive bonding or thermal bonding may be utilizing for forming the fluid-filled body 202 during the molding or thermoforming process.

As seen in FIGS. 3B, 8-9 and 11A, the first barrier layer 202a defines an upper surface 204 of the fluid-filled body 202. Referring to FIGS. 3B, 10 and 11A, the iridescent layer 202c defines a lower surface 206 of the fluid-filled body 202. Furthermore, as seen in FIGS. 3B, 8 and 11A, the iridescent layer 202c defines a side surface 208 of the fluid-filled body 202; the side surface 208 connects the upper surface 204 to the lower surface 206. As seen in FIG. 3B, the upper surface 204 of the fluid-filled body 202 of the heel portion 200 is connected to upper portion 12. Optionally, if an outsole portion 36 is included in the design of the article of footwear 10, the outsole portion may, as seen in FIG. 3B, be disposed over some of the lower surface 206 of the fluid-filled body 202 of the heel portion 200 such that some of the lower surface 206 is exposed and not obscured by the outsole portion 36.

Referring to FIGS. 3B and 11A, one or more of the three or more layers 202a, 202b, 202c that forms the fluid-filled body 202 contributes to the fluid-filled body 202 defining an outer peripheral flange 210. Furthermore, as seen in FIGS. 8-10, one or more of the three or more layers 202a, 202b, 202c that forms the fluid-filled body 202 contributes to the fluid-filled body 202 defining a webbing 212 that generally defines the upper surface 204. As seen in FIGS. 3B and 11A, the first barrier layer 202a and the second barrier layer 202b are arranged in a spaced-apart relationship by a distance D such that the fluid-filled body 202 defines a fluid-filled chamber 214. The fluid-filled chamber 214 encloses or contains a fluid within heel portion 200.

The fluid-filled chamber 214 and the outer peripheral flange 210 each define a generally U-shaped configuration that, when incorporated into the article of footwear 10, extends: (1) along the lateral side 22, (2) around a rear portion of the heel region 20 and (3) along the medial side 24, thereby extending around a peripheral area of heel portion 200. As similarly described above with respect to the plurality of fluid-filled chambers 114, the fluid-filled chamber 214 encloses or contains a fluid within heel portion 200 and is formed by the first barrier layer 202a and the second barrier layer 202b. One or more of the three or more layers 202a, 202b, 202c that forms the fluid-filled body 202 contributes to the fluid-filled body 202 defining the outer peripheral flange 210; as seen in FIG. 11A, one or more of the three or more layers 202a, 202b, 202c are molded and joined together, protruding outwardly from fluid-filled chamber 214. The webbing 212 extends through a central area of heel portion 200 and between lateral and medial portions of the fluid-filled chamber 214. Like the outer peripheral flange 210, the webbing 212 is formed from portions of one or more of the three or more layers 202a, 202b, 202c that are joined together. Although adhesive bonding may be utilized in joining two or more of the three or more layers 202a, 202b, 202c in one or more areas defining, for example, the outer peripheral flange 210 and the webbing 212, thermal bonding may also join two or more of the three or more layers 202a, 202b, 202c during the molding or thermoforming process.

The fluid-filled chamber 214 is the primary component of heel portion 200 that encloses the fluid. In areas immediately adjacent to the fluid-filled chamber 214, the three or more layers 202a, 202b, 202c are joined to each other to form a bond that seals the fluid within heel portion 200. More particularly, the outer peripheral flange 210 and the webbing 212 cooperatively bound or otherwise extend around the fluid-filled chamber 214 and are formed from areas of the three or more layers 202a, 202b, 202c that are bonded to each other, thereby sealing the fluid within the fluid-filled chamber 214. In further configurations of the article of footwear 10, the fluid-filled chamber 214 may be subdivided into two or more sub-chambers that may be pressurized differently. In other configurations, the heel portion 200 may be a part of a fluid system that pumps fluid into the fluid-filled chamber 214. In still further configurations, the medial and lateral portions may be connected through a central portion of the webbing 212.

The upper surface 204 has a generally concave configuration, as depicted in, for example, FIG. 11A, that supports the foot when the article of footwear 10 is worn. As such, the foot effectively rests within the U-shaped configurations of the fluid-filled chamber 214 and the outer peripheral flange 210. This configuration may provide stability to the article of footwear 10 and ensures that the foot remains properly positioned relative to heel portion 200 and other portions of sole portion 14.

The outer peripheral flange 210 may also form a peripheral seam or bonded area that joins the three or more layers 202a, 202b, 202c and assists with sealing the fluid within heel portion 200. In general, the outer peripheral flange 210 has a height of at least five (5) millimeters and extends in an outward direction from a remainder of heel portion 200. In some instances, the outer peripheral flange 210 extends in an upward direction from the peripheral area or an upper area of heel portion 200. In some embodiments, the area of the outer peripheral flange 210 corresponding with the upper surface 204 faces toward and is secured to upper portion 12 whereas the area of the outer peripheral flange 210 corresponding with lower surface 206 faces away from and forms a portion of an exterior surface of the article of footwear 10 (e.g., one surface of the outer peripheral flange 210 is secured to the upper portion 12 and the opposite surface of the outer peripheral flange 210 faces away from the upper portion 12). In some examples, the outer peripheral flange 210 is a relatively thick and stiff portion of heel portion 200, enhancing the stability of the article of footwear 10. As with the outer peripheral flange 110 of the forefoot portion 100, the outer peripheral flange 210 may provide a defined lasting margin during steps of the manufacturing process that involve bonding upper portion 12 to heel portion 200.

Referring to the cross-sectional view of FIG. 11A, in an example, the outer peripheral flange 210 is depicted as having a tapered configuration, with the portions of the outer peripheral flange 210 located adjacent to the fluid-filled chamber 214 having greater thickness than the portions of the outer peripheral flange 210 that are spaced from the fluid-filled chamber 214. In some instances, the outer peripheral flange 210 has a tapered configuration with a first thickness adjacent to the void in the fluid-filled chamber 214 and a second thickness spaced away from the void, the first thickness being greater than the second thickness. Moreover, in other examples, the thickness of the portions of the outer peripheral flange 210 located adjacent to the void (i.e., the first thickness) is greater than either of: (1) the thickness of the webbing 212 in the central area of heel portion 200 and (2) the sum of the thicknesses of the three or more layers 202a, 202b, 202c. Although the outer peripheral flange 210 is formed from the three or more layers 202a, 202b, 202c, the outer peripheral flange 210 has a greater thickness than both of the three or more layers 202a, 202b, 202c combined.

Although the configuration of the heel portion 200 discussed above provides an exemplary configuration for use in the article of footwear 10, a variety of other configurations may also be utilized. In an example, the outer peripheral flange 210 may angle outwardly rather than having a vertical orientation; in such a configuration, the outer peripheral flange 210 may support edges of the foot, rather than extending along sides of the foot. In other examples, the fluid-filled chamber 214 may bulge outwardly to a lesser degree, which locates the outer peripheral flange 210 at the immediate periphery of heel portion 200 and forms vertical sides for the heel portion 200. In yet another example, the width of the fluid-filled chamber 214 may increase, which may modify the cushioning or force attenuation properties of the heel portion 200. In other configurations, the outer peripheral flange 210 may have a squared aspect.

Although the area between opposite sides of the fluid-filled chamber 214 and under the webbing 212 may be open, other components such as, for example, foam elements may be located in this area. In one example, a foam element may be located under and in contact with the webbing 212. Among other aspects, the foam element may affect the flexibility or force attenuation properties of heel portion 200. Moreover, the shape and location of the foam element may also affect properties of heel portion 200. In an example, the foam element has a tapered configuration, which may alter properties between forward and rearward areas of the heel portion 200. Similarly, the foam element is tapered and spaced from the webbing 212. Accordingly, the heel portion 200 may vary in many aspects.

Figure 12:
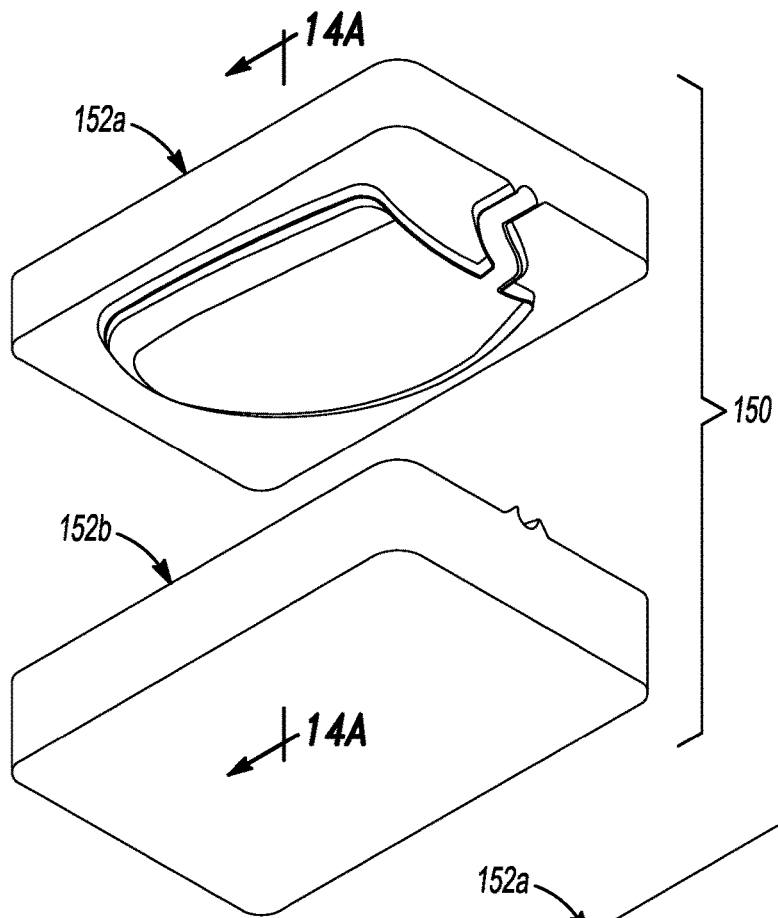
FIG. 12 is a bottom perspective view of a mold for forming the forefoot portion of FIGS. 4-7A.
Figure 13:
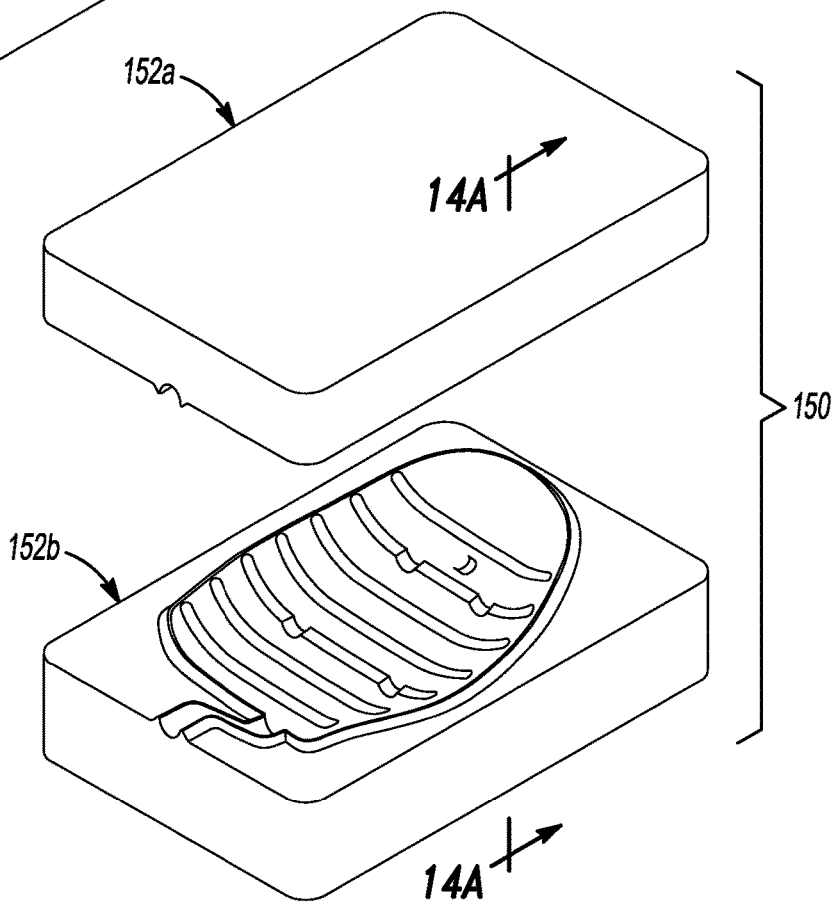
FIG. 13 is a top perspective view of the mold of FIG. 12.

Referring to FIGS. 12-14E, a methodology for manufacturing a forefoot portion 100 is described. With reference to FIGS. 12-13, an exemplary mold 150 for forming the forefoot portion 100 is shown including a first mold portion 152a and a second mold portion 152b. As seen in FIGS. 14A-14E, the mold 150 forms the forefoot portion 100 defining the fluid-filled body 102 of FIG. 7A from the first barrier layer 102a, the second barrier layer 102b and the iridescent layer 102c. More particularly, the mold 150 facilitates the manufacturing process by: (1) shaping the first barrier layer 102a, the second barrier layer 102b and the iridescent layer 102c in areas corresponding with the plurality of fluid-filled chambers 114, the outer peripheral flange 110, and the fluid conduits 116 and (2) joining the first barrier layer 102a, the second barrier layer 102b and the iridescent layer 102c in areas corresponding with the outer peripheral flange 110.

Referring to FIGS. 12 and 14A, the first mold portion 152a includes a mold surface defined by an outer peripheral pinch surface 154 that is joined to an inner peripheral first seam-forming surface 156 that is joined to a central compression surface 158. The outer peripheral pinch surface 154 and the inner peripheral first seam-forming surface 156 are angled relative to each other, with the outer peripheral pinch surface 154 being more vertical than the inner peripheral first seam-forming surface 156.

Referring to FIGS. 13 and 14A, the second mold portion 152b includes an outer peripheral pinch edge surface 160 that is joined to an inner peripheral second seam-forming surface 162 that is joined to a central compression surface 164. In some instances, the outer peripheral pinch edge surface 160 may define a relatively sharp corner or angled area of the second mold portion 152b, the inner peripheral second seam-forming surface 162 extends downward and may be generally parallel to the outer peripheral pinch surface 154 of the first mold portion 152a.

Referring to FIG. 14D, the first mold portion 152a cooperates with the second mold portion 152b to define a void 166 within the mold 150. As will be described in the following disclosure at FIGS. 14A-14E, when the first barrier layer 102a, the second barrier layer 102b and the iridescent layer 102c are arranged between the first mold portion 152a and the second mold portion 152b and disposed within the void 166, the surfaces 154-158 of the first mold portion 152a and the surfaces 160-164 of the second mold portion 152b define a shape corresponding to the forefoot portion 100, such that upon pressurization of the void 166, the surfaces 154-158 of the first mold portion 152a and the surfaces 160-164 of the second mold portion 152b forms the first barrier layer 102a, the second barrier layer 102b and the iridescent layer 102c to define features of forefoot portion 100 described above at FIGS. 4-7A.

Referring to FIG. 14A, each of the first barrier layer 102a, the second barrier layer 102b and the iridescent layer 102c are initially located between each of the first mold portion 152a and the second mold portion 152b, which are arranged in a spaced-apart or open configuration. In this configuration, the first barrier layer 102a is positioned adjacent to or opposite the first mold portion 152a and the iridescent layer 102c is positioned adjacent to or opposite the second mold portion 152b. In addition to the arrangement of the first barrier layer 102a and the iridescent layer 102c as described above, the second barrier layer 102b is disposed between the first barrier layer 102a and the iridescent layer 102c. In some examples, prior to positioning the iridescent layer 102c adjacent or opposite the second mold portion 152b, the iridescent layer 102c may be attached to one of the first barrier layer 102a or the second barrier layer 102b; in the illustrated example as seen in FIG. 14B, an upper surface $102c_U$ of the iridescent layer 102c is attached to a lower surface $102b_L$ of the second barrier layer 102b.

A shuttle frame or other device (not shown) may be utilized to assist in positioning any of the first barrier layer 102a, the second barrier layer 102b and the iridescent layer 102c. As part of the manufacturing process, one or all of the first barrier layer 102a, the second barrier layer 102b and the iridescent layer 102c are heated to a temperature that facilitates shaping and bonding of the first barrier layer 102a, the second barrier layer 102b and the iridescent layer 102c. As an example, various radiant heaters or other devices (not shown) may be utilized to heat the first barrier layer 102a, the second barrier layer 102b and the iridescent layer 102c; the act of heating the first barrier layer 102a, the second barrier layer 102b and the iridescent layer 102c may occur prior to locating the first barrier layer 102a, the second barrier layer 102b and the iridescent layer 102c between the first mold portion 152a and the second mold portion 152b. As another example, one or both of the first mold portion 152a and the second mold portion 152b may be heated such that contact of the first barrier layer 102a with the surfaces 154-158 of the first mold portion 152a and/or the iridescent layer 102c with the surfaces 160-164 of the second mold portion 152b at a later portion of the manufacturing process raises the temperature to a level that facilitates shaping and bonding of the first barrier layer 102a, the second barrier layer 102b and the iridescent layer 102c.

Referring to FIG. 14B, once the first barrier layer 102a, the second barrier layer 102b and the iridescent layer 102c are positioned as described above, the first mold portion 152a and the second mold portion 152b translate or otherwise move toward each other and begin to close upon and capture the first barrier layer 102a, the second barrier layer 102b and the iridescent layer 102c therebetween within the void 166 formed by the first mold portion 152a and the second mold portion 152b. As the first mold portion 152a and the second mold portion 152b move toward each other, various techniques may be utilized to draw the first barrier layer 102a, the second barrier layer 102b and the iridescent layer 102c against the surfaces 154-158 of the first mold portion 152a and/or the iridescent layer 102c with the surfaces 160-164 of the second mold portion 152b, thereby beginning the process of shaping the first barrier layer 102a, the second barrier layer 102b and the iridescent layer 102c.

In an example, air may be partially evacuated (by, e.g., vacuum ports formed by the first mold portion 152a and/or the second mold portion 152b) from void 166 between: (1) one or more of the surfaces 154-158 of the first mold portion 152a and the first barrier layer 102a and (2) one or more of the surfaces 160-164 of the second mold portion 152b and the iridescent layer 102c. By removing air from the void 166, the first barrier layer 102a and the iridescent layer 102c are drawn into contact with one or more of the surfaces 154-158 of the first mold portion 152a and one or more of the surfaces 160-164 of the second mold portion 152b. In another example, air may be injected into the void 166 between, for example: (1) the first barrier layer 102a and the second barrier layer 102b and/or (2) the second barrier layer 102b and the iridescent layer 102c, thereby elevating the pressure between the first barrier layer 102a, the second barrier layer 102b and the iridescent layer 102c. During a preparatory stage of this process, an injection needle may be located between the first barrier layer 102a, the second barrier layer 102b and the iridescent layer 102c and a gas may then be ejected from the injection needle such that the first barrier layer 102a, the second barrier layer 102b and the iridescent layer 102c engage one or more of the surfaces 154-158 of the first mold portion 152a and one or more of the surfaces 160-164 of the second mold portion 152b. Each of these techniques may be used together or independently.

Figure 14C:
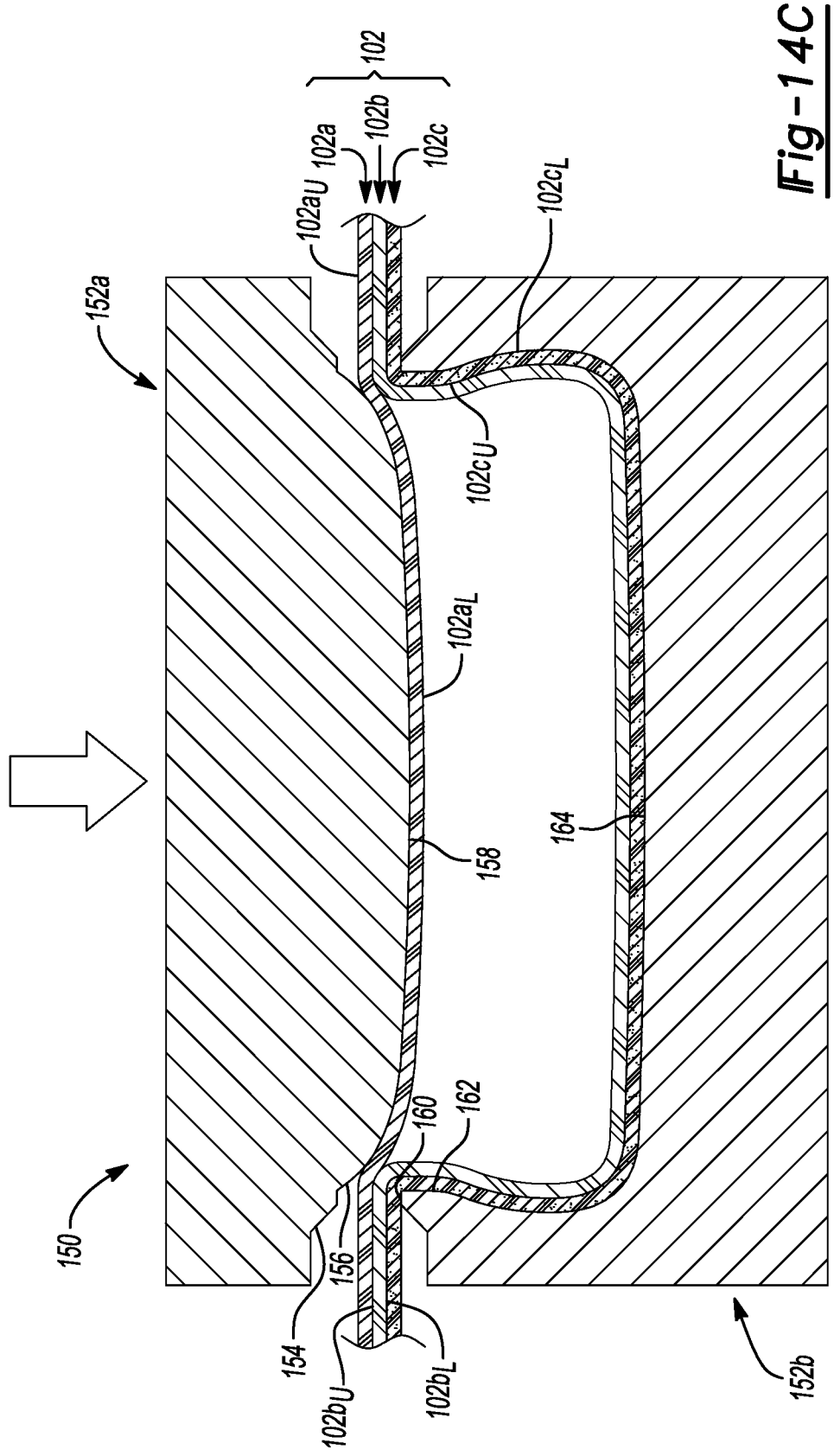

Referring to FIG. 14C, as mold the first mold portion 152a and the second mold portion 152b continue to move toward each other, the first barrier layer 102a, the second barrier layer 102b and the iridescent layer 102c are pinched between the first mold portion 152a and the second mold portion 152b. More particularly, the first barrier layer 102a, the second barrier layer 102b and the iridescent layer 102c are compressed between the outer peripheral pinch surface 154 of the first mold portion 152a and the outer peripheral pinch edge surface 160 of the second mold portion 152b. In addition to beginning the process of separating excess portions of the first barrier layer 102a, the second barrier layer 102b and the iridescent layer 102c from portions that form forefoot portion 100, the pinching of the first barrier layer 102a, the second barrier layer 102b and the iridescent layer 102c begins the process of bonding or joining the first barrier layer 102a, the second barrier layer 102b and the iridescent layer 102c in the area defined by the outer peripheral flange 110.

Referring to FIG. 14D, the first mold portion 152a and the second mold portion 152b are further advanced toward each other such that the mold 150 is arranged in a closed configuration. As the arrangement of the first mold portion 152a and the second mold portion 152b changes from what is shown in FIG. 14C to that of FIG. 14D, the outer peripheral pinch surface 154 of the first mold portion 152a contacts and slides against a portion of the inner peripheral second seam-forming surface 162 of the second mold portion 152b. The contact between the outer peripheral pinch surface 154 of the first mold portion 152a and the inner peripheral second seam-forming surface 162 of the second mold portion 152b effectively severs excess portions of the first barrier layer 102a, the second barrier layer 102b and the iridescent layer 102c from portions that form forefoot portion 100. In addition, the sliding movement pushes portions of the material forming the first barrier layer 102a, the second barrier layer 102b and the iridescent layer 102c downward and further into the void 166. Moreover, the material forming the first barrier layer 102a, the second barrier layer 102b and the iridescent layer 102c compacts or otherwise collects in the area between the inner peripheral first seam-forming surface 156 of the first mold portion 152a and the inner peripheral second seam-forming surface 162 of the second mold portion 152b. Given that the inner peripheral first seam-forming surface 156 of the first mold portion 152a and the inner peripheral second seam-forming surface 162 of the second mold portion 152b are angled relative to each other, the compacted material defined by the first barrier layer 102a, the second barrier layer 102b and the iridescent layer 102c forms a generally triangular or tapered structure, which results in the formation of the outer peripheral flange 110. In addition to forming the outer peripheral flange 110, the first barrier layer 102a, the second barrier layer 102b and the iridescent layer 102c are shaped to form the plurality of fluid-filled chambers 114.

Figure 14E:
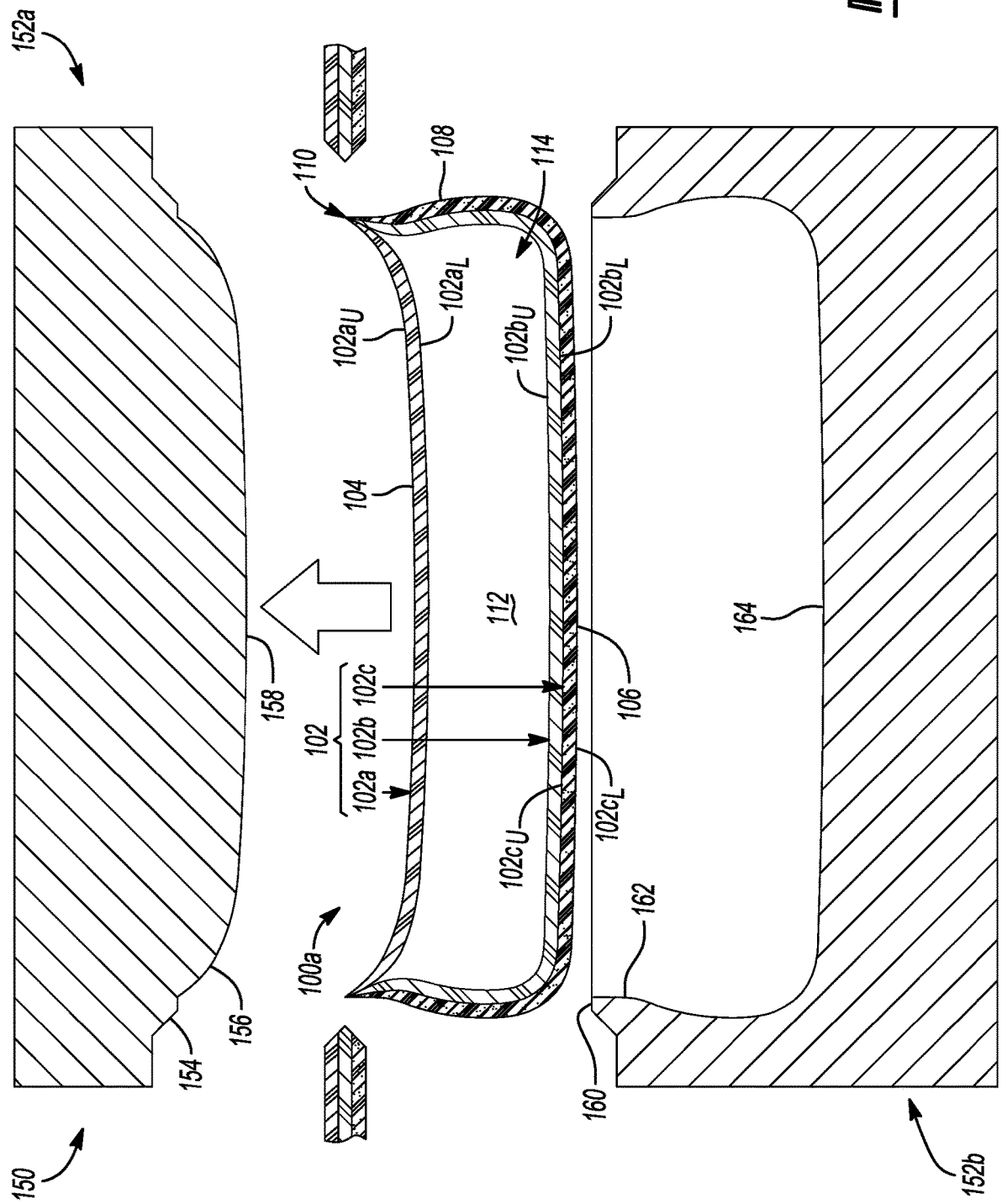

Referring to FIG. 14E, a peripheral portion of the void 166 proximate the inner peripheral first seam-forming surface 156 of the first mold portion 152a and the inner peripheral second seam-forming surface 162 of the second mold portion 152b defines an area that forms the outer peripheral flange 110. The non-parallel configuration between the inner peripheral first seam-forming surface 156 of the first mold portion 152a and the inner peripheral second seam-forming surface 162 of the second mold portion 152b results in a tapered space where the first barrier layer 102a, the second barrier layer 102b and the iridescent layer 102c collects to form the outer peripheral flange 110. A distance across the space between the inner peripheral first seam-forming surface 156 of the first mold portion 152a and the inner peripheral second seam-forming surface 162 of the second mold portion 152b is greater adjacent to a portion of the void 166 that forms the plurality of fluid-filled chambers 114 than in the area where the inner peripheral first seam-forming surface 156 of the first mold portion 152a and the inner peripheral second seam-forming surface 162 of the second mold portion 152b meet, which is spaced from the portion of the void 166 that forms the plurality of fluid-filled chambers 114. Although the configuration of the tapered space between the inner peripheral first seam-forming surface 156 of the first mold portion 152a and the inner peripheral second seam-forming surface 162 of the second mold portion 152b may vary, an angle formed between the inner peripheral first seam-forming surface 156 of the first mold portion 152a and the inner peripheral second seam-forming surface 162 of the second mold portion 152b may be in a range of twenty degrees and forty-five degrees.

As discussed above, the material forming the first barrier layer 102a, the second barrier layer 102b and the iridescent layer 102c compacts or otherwise collects in the area between the inner peripheral first seam-forming surface 156 of the first mold portion 152a and the inner peripheral second seam-forming surface 162 of the second mold portion 152b. This compaction effectively thickens one or both of the first barrier layer 102a, the second barrier layer 102b and the iridescent layer 102c (i.e., whereas the first barrier layer 102a, the second barrier layer 102b and the iridescent layer 102c have a first thickness in FIG. 14A and a second, greater thickness at the stage depicted in FIG. 14D when the outer peripheral flange 110 is formed). The compaction of the first barrier layer 102a, the second barrier layer 102b and the iridescent layer 102c occurs as the outer peripheral pinch surface 154 of the first mold portion 152a contacts and slides against a portion of the inner peripheral second seam-forming surface 162 of the second mold portion 152b.

Referring to FIG. 14E, when formation of the forefoot portion 100 is complete, the mold 150 is opened and the forefoot portion 100 is removed from the mold 150 in order to permit the forefoot portion 100 to cool. A fluid may then be injected into forefoot portion 100 to pressurize the plurality of fluid-filled chambers 114, thereby completing the manufacture of forefoot portion 100. As a final step in the process, the forefoot portion 100 may be incorporated into sole portion 14 of the article of footwear 10.

Figure 16:
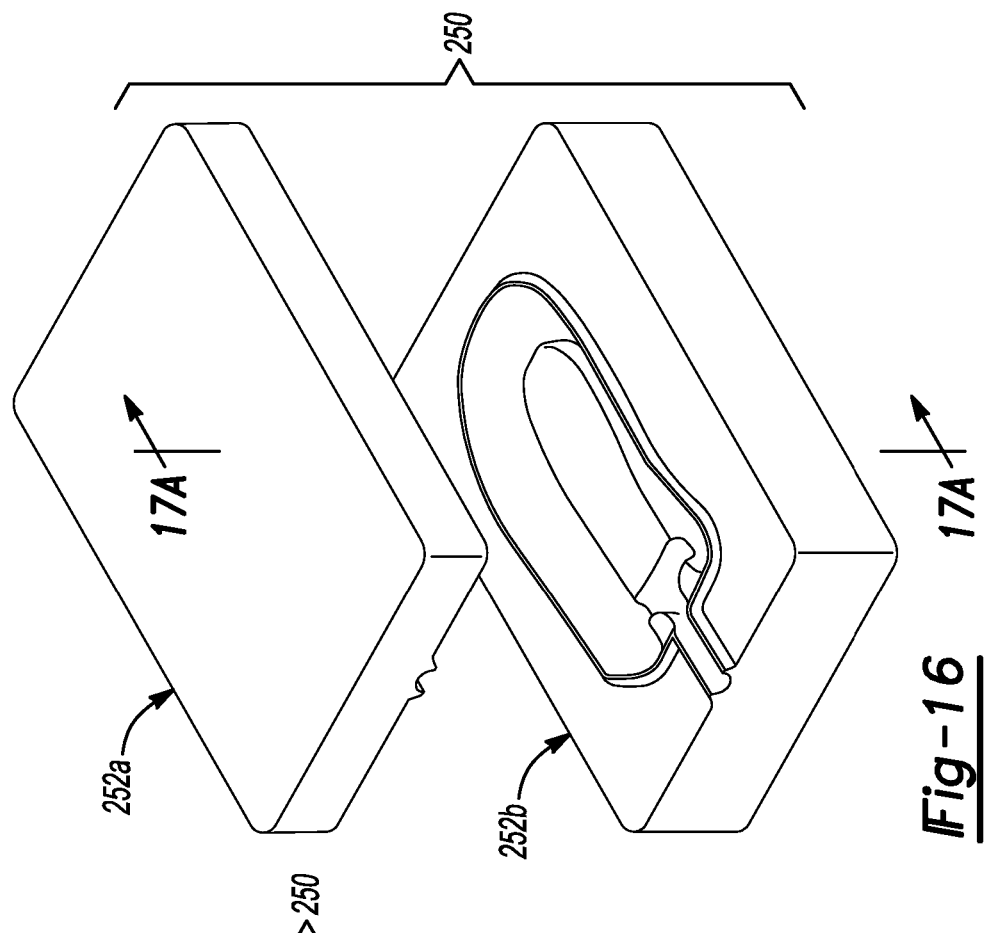
FIG. 16 is a top perspective view of the mold of FIG. 15.
Figure 15:
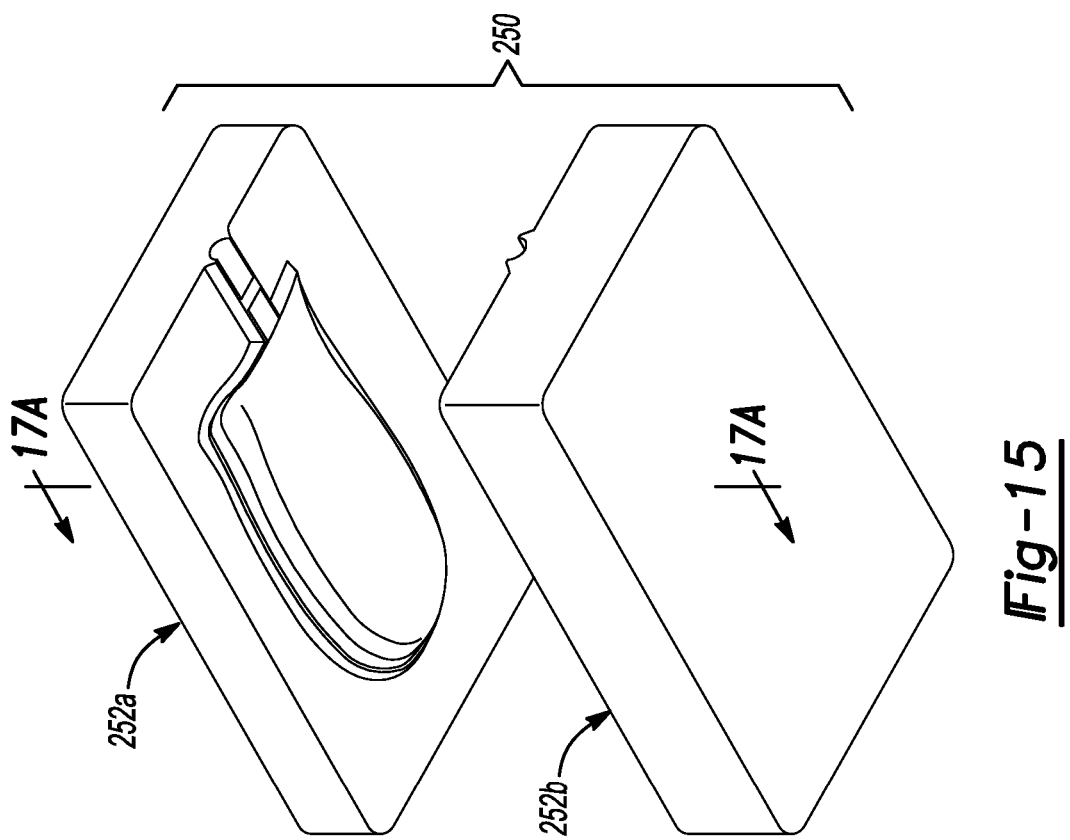
FIG. 15 is a bottom perspective view of a mold for forming the heel portion of FIGS. 8-11A; 11A.

Although a variety of manufacturing processes may be utilized for forming the heel portion 200, the heel portion 200 may be formed through a process that is substantially similar to the process discussed above for forming the forefoot portion 100. With reference to FIGS. 15-16, a mold 250 is shown including a first mold portion 252a and a second mold portion 252b. As seen in FIGS. 17A-17D, the first mold portion 252a includes a mold surface defined by an outer peripheral pinch surface 254 that is joined to an inner peripheral first seam forming surface 256 that is joined to a central compression surface 258. The second mold portion 252b includes an outer peripheral pinch edge surface 260 that is joined to an inner peripheral second seam-forming surface 262 that is joined to a central compression surface 264.

The mold 250 forms the heel portion 200 defining the fluid-filled body 202 of FIG. 11A from the first barrier layer 202a, the second barrier layer 202b and the iridescent layer 202c. More particularly, the mold 250 facilitates the manufacturing process by: (1) shaping the first barrier layer 202a, the second barrier layer 202b and the iridescent layer 202c in areas corresponding with the fluid-filled chamber 214 and the outer peripheral flange 210 and (2) joining the first barrier layer 202a, the second barrier layer 202b and the iridescent layer 202c in areas corresponding with the outer peripheral flange 210. In addition, the mold 250 may facilitate the bonding of the outsole portion 36 to the heel portion 200.

Figure 17B:
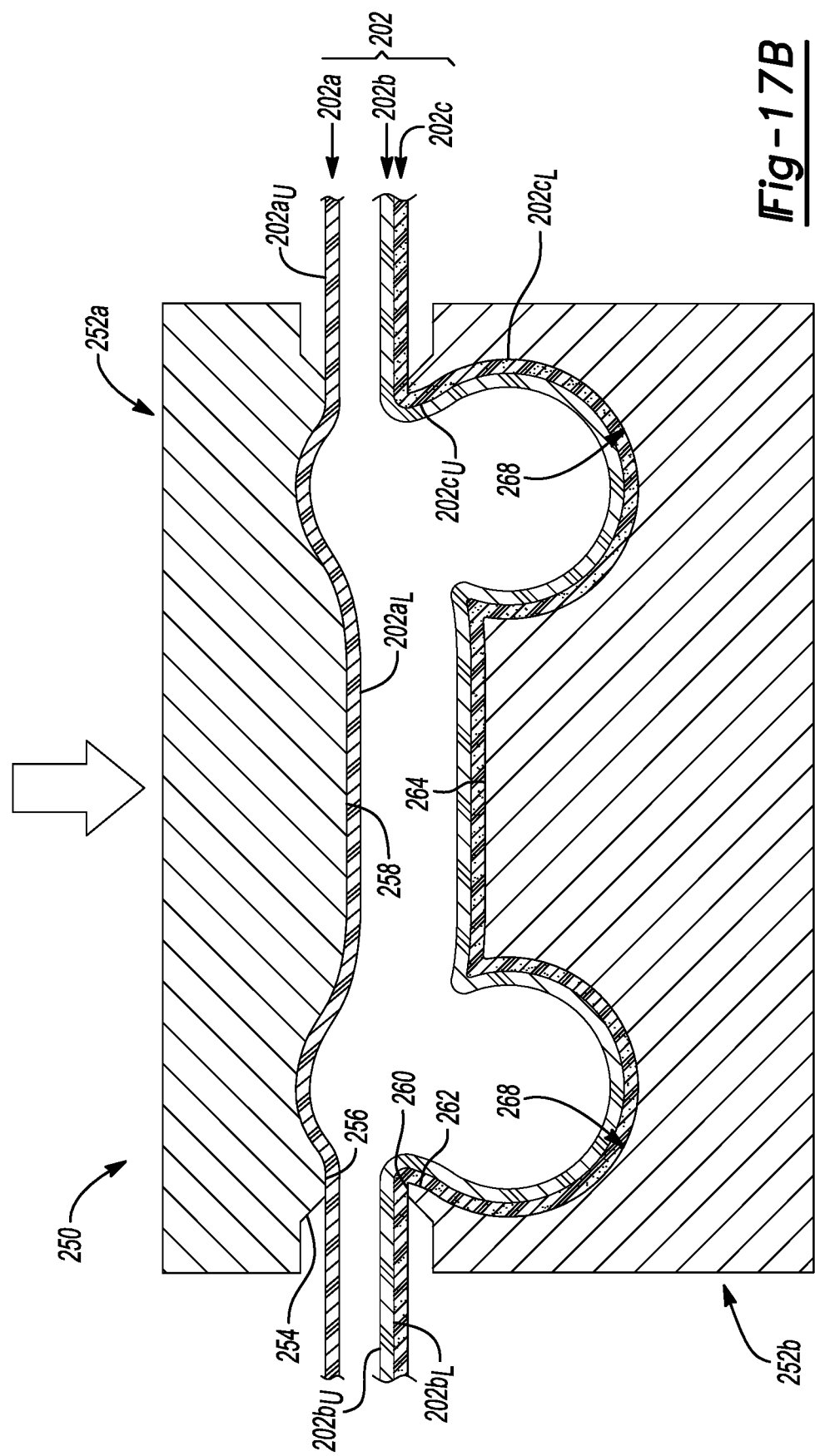

Referring to FIG. 17A, each of the first barrier layer 202a, the second barrier layer 202b and the iridescent layer 202c are arranged between each of the first mold portion 252a and the second mold portion 252b. Referring to FIG. 17A, each of the first barrier layer 202a, the second barrier layer 202b and the iridescent layer 202c are initially located between each of the first mold portion 252a and the second mold portion 252b, which are arranged in a spaced-apart or open configuration. In this configuration, the first barrier layer 202a is positioned adjacent to or opposite the first mold portion 252a and the iridescent layer 202c is positioned adjacent to or opposite the second mold portion 252b. In addition to the arrangement of the first barrier layer 202a and the iridescent layer 202c as described above, the second barrier layer 202b is disposed between the first barrier layer 202a and the iridescent layer 202c. In some examples, prior to positioning the iridescent layer 202c adjacent or opposite the second mold portion 252b, the iridescent layer 202c may be attached to one of the first barrier layer 202a or the second barrier layer 202b; in the illustrated example as seen in FIG. 17B, an upper surface $202c_U$ of the iridescent layer 202c is attached to a lower surface $202b_L$ of the second barrier layer 202b. In addition, one or more elements that form the outsole portion 36 may also be located relative to the mold 250.

Referring to FIG. 17B, once the first barrier layer 202a, the second barrier layer 202b and the iridescent layer 202c are positioned as described above, and, if optionally included, the elements of the outsole portion 36 are located within depressions 268 formed by the second mold portion 252b, the first mold portion 252a and the second mold portion 252b translate or otherwise move toward each other and begin to close upon and capture the first barrier layer 202a, the second barrier layer 202b and the iridescent layer 202c there-between within a void 266 (see, e.g., FIG. 17C) formed by the first mold portion 252a and the second mold portion 252b. As discussed above in FIGS. 14A-14E, in a substantially similar fashion, air may be partially evacuated from the areas between: (1) surface portions of the first mold portion 252a and the first barrier layer 202a and (2) surface portions of the second mold portion 252b and the iridescent layer 202c. Additionally, air may be injected into the void 266 between, for example: (1) the first barrier layer 202a and the second barrier layer 202b and/or (2) the second barrier layer 202b and the iridescent layer 202c, thereby elevating the pressure between the first barrier layer 202a, the second barrier layer 202b and the iridescent layer 202c. Using one or both of these techniques, the first barrier layer 202a, the second barrier layer 202b and the iridescent layer 202c are induced to engage the surfaces of the first mold portion 252a and the second mold portion 252b.

Referring to FIG. 17C, as the first mold portion 252a and the second mold portion 252b continue to move toward each other, the first barrier layer 202a, the second barrier layer 202b and the iridescent layer 202c are compressed between the first mold portion 252a and the second mold portion 252b. In an example, the first barrier layer 202a, the second barrier layer 202b and the iridescent layer 202c are compressed to form outer peripheral flange 210 and the webbing 212.

In some instances, the iridescent layer 202c may bond with the outsole portion 36. In some configurations, the outsole portion 36 may be thermal bonded to the heel portion 200 during the manufacturing process. In an example, when each of the iridescent layer 202c and the outsole portion 36 are formed from similar or compatible materials, or, when the outsole portion 36 is at least partially formed from a material defining the fluid-filled chamber 214, heating of the components may induce thermal bonding between the components.

Referring to FIG. 17D, when formation of the heel portion 200 is complete, the mold 250 is opened and the heel portion 200 is removed and permitted to cool. A fluid may then be injected into heel portion 200 to pressurize the fluid-filled chamber 214, thereby completing the manufacturing process of the heel portion 200. As a final step in the process, the heel portion 200 may be incorporated into sole portion 14 of the article of footwear 10.

The following Clauses provide an exemplary configuration for an article of footwear described above.

Clause 1: A fluid-filled chamber comprising a first barrier layer, a second barrier layer attached to the first barrier layer and cooperating with the first barrier layer to define an interior void and a third layer attached to one of the first barrier layer and the second barrier layer and including mineral mica operable to provide the one of the first barrier layer and the second barrier layer with an iridescent appearance caused by differential refraction of light waves.

Clause 2: The fluid-filled chamber of Clause 1, wherein the third layer is formed from a polymer material.

Clause 3: The fluid-filled chamber of Clause 1, wherein the third layer is formed from a polyurethane material.

Clause 4: The fluid-filled chamber of Clause 1, wherein the mica is at least one of ground mica, built-up mica, and sheet mica.

Clause 5: The fluid-filled chamber of Clause 1, wherein the mica is deposited on an outer surface of the third layer.

Clause 6: The fluid-filled chamber of Clause 1, wherein the third layer is impregnated with mica.

Clause 7: The fluid-filled chamber of any of the preceding Clauses, wherein the third layer is disposed within the interior void.

Clause 8: The fluid-filled chamber of any of the preceding Clauses, wherein the third layer is attached to an exterior surface of at least one of the first barrier layer and the second barrier layer.

Clause 9: The fluid-filled chamber of any of the preceding Clauses, wherein the third layer is attached to an interior surface of at least one of the first barrier layer and the second barrier layer within the interior void.

Clause 10: An article of footwear incorporating the fluid-filled chamber of any of the preceding Clauses.

Clause 11: A method comprising attaching a first iridescent material to a first barrier sheet, inserting the first barrier sheet into a mold, inserting a second barrier sheet into the mold, applying at least one of heat and pressure to at least one of the first barrier sheet, the second barrier sheet, and the iridescent material via the mold, joining the first barrier sheet and the second barrier sheet together to define a chamber and inflating the chamber.

Clause 12: The method of Clause 11, wherein inserting the first barrier sheet into the mold includes positioning the first iridescent material between the first barrier sheet and the second barrier sheet.

Clause 13: The method of Clause 11, wherein inserting the first barrier sheet into the mold includes positioning the first barrier sheet between the first iridescent material and the second barrier sheet.

Clause 14: The method of any of the preceding Clauses, further comprising attaching a second iridescent material to the second barrier sheet.

Clause 15: The method of Clause 14, wherein inserting the second barrier sheet into the mold includes positioning the second iridescent material between the second barrier sheet and the first barrier sheet.

Clause 16: The method of Clause 14, wherein inserting the second barrier sheet into the mold includes positioning the second barrier sheet between the second iridescent material and the first barrier sheet.

Clause 17: The method of any of the preceding Clauses, wherein providing the first iridescent material includes providing a polymer material having an iridescent appearance caused by differential refraction of light waves.

Clause 18: The method of any of the preceding Clauses, wherein providing the first iridescent material includes providing a material including mica.

Clause 19: The method of Clause 18, wherein providing a material including mica includes providing a material impregnated with mica.

Clause 20: The method of any of the preceding Clauses, further comprising incorporating the chamber into an article of footwear.

Clause 21: A method comprising inserting a first barrier sheet into a mold, inserting a second barrier sheet into a mold, inserting a first iridescent sheet into the mold, applying at least one of heat and pressure to the first barrier sheet, the second barrier sheet, and the iridescent sheet via the mold joining the first barrier sheet and the second barrier sheet together to define a chamber, joining the iridescent sheet to at least one of the first barrier sheet and the second barrier sheet and inflating the chamber.

Clause 22: The method of Clause 21, wherein inserting the first barrier sheet into the mold includes positioning the first iridescent material between the first barrier sheet and the second barrier sheet.

Clause 23: The method of Clause 21, wherein inserting the first barrier sheet into the mold includes positioning the first barrier sheet between the first iridescent material and the second barrier sheet.

Clause 24: The method of any of the preceding Clauses, further comprising inserting a second iridescent material into the mold.

Clause 25: The method of Clause 24, wherein inserting the second iridescent material into the mold includes positioning the second iridescent material between the second barrier sheet and the first barrier sheet.

Clause 26: The method of Clause 24, wherein inserting the second iridescent material into the mold includes positioning the second barrier sheet between the second iridescent material and the first barrier sheet.

Clause 27: The method of any of the preceding Clauses, wherein providing the first iridescent material includes providing a polymer material having an iridescent appearance caused by differential refraction of light waves.

Clause 28: The method of any of the preceding Clauses, wherein providing the first iridescent material includes providing a material including mica.

Clause 29: The method of Clause 28, wherein providing a material including mica includes providing a material impregnated with mica.

Clause 30: The method of any of the preceding Clauses, further comprising incorporating the chamber into an article of footwear.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A fluid-filled chamber comprising:
    a first barrier layer formed from a polymer material;
    a second barrier layer formed from a polymer material, the second barrier layer attached to the first barrier layer and cooperating with the first barrier layer to define an interior void and a peripheral flange; and
    a third layer formed from a polymer material, disposed within the interior void, attached to an interior surface of at least one of the first barrier layer and the second barrier layer, and extending from the peripheral flange at a medial side to the peripheral flange at a lateral side, the third layer including mineral mica deposited on an outer surface of the third layer and operable to provide the one of the first barrier layer and the second barrier layer with an iridescent appearance caused by differential refraction of light waves.

2. The fluid-filled chamber of claim 1, wherein the third layer is formed from a polyurethane material.

3. The fluid-filled chamber of claim 1, wherein the mica is at least one of ground mica, built-up mica, and sheet mica.

4. The fluid-filled chamber of claim 1, wherein the third layer is impregnated with mica.

5. The fluid-filled chamber of claim 1, further comprising a fourth layer attached to the one of the first barrier layer and the second barrier layer on an opposite side of the one of the first barrier layer and the second barrier layer than the third layer, the fourth layer including mineral mica operable to provide the one of the first barrier layer and the second barrier layer with an iridescent appearance caused by differential refraction of light waves.

6. The fluid-filled chamber of claim 1, further comprising a fourth layer attached to the other of the first barrier layer and the second barrier layer.

7. An article of footwear incorporating the fluid-filled chamber of claim 1.

\* \* \* \* \*